(12) United States Patent
Ma et al.

(10) Patent No.: US 12,554,311 B2
(45) Date of Patent: Feb. 17, 2026

(54) SEMICONDUCTOR CIRCUIT DEVICE

(71) Applicant: TOHOKU UNIVERSITY, Miyagi (JP)

(72) Inventors: Yitao Ma, Miyagi (JP); Tetsuo Endoh, Miyagi (JP); Hui Shen, Miyagi (JP)

(73) Assignee: Tohoku University, Miyagi (JP)

( * ) Notice: Subject to any disclaimer, the term of this patent is extended or adjusted under 35 U.S.C. 154(b) by 0 days.

(21) Appl. No.: 18/553,672

(22) PCT Filed: Mar. 31, 2022

(86) PCT No.: PCT/JP2022/016880
§ 371 (c)(1),
(2) Date: Oct. 2, 2023

(87) PCT Pub. No.: WO2022/211098
PCT Pub. Date: Oct. 6, 2022

(65) Prior Publication Data
US 2024/0184349 A1    Jun. 6, 2024

(30) Foreign Application Priority Data
Mar. 31, 2022    (JP) .................................. 2021-062302

(51) Int. Cl.
*G06F 1/32*    (2019.01)
*G06F 1/3237*  (2019.01)
*G06F 1/3296*  (2019.01)

(52) U.S. Cl.
CPC .......... *G06F 1/3237* (2013.01); *G06F 1/3296* (2013.01)

(58) Field of Classification Search
CPC ........................................................ G06F 1/32
See application file for complete search history.

(56) References Cited

U.S. PATENT DOCUMENTS

| 2013/0191673 A1* | 7/2013 | Koyama | G06F 1/3287 713/300 |
| 2014/0310549 A1* | 10/2014 | Herbeck | G06F 1/3225 713/322 |
| 2019/0187775 A1* | 6/2019 | Rotem | G06F 1/324 |

FOREIGN PATENT DOCUMENTS

| JP | 2007006290 | 1/2007 |
| JP | 2010211591 | 9/2010 |
| JP | 2012069100 | 4/2012 |
| JP | 2013214296 | 10/2013 |
| JP | 2014002726 | 1/2014 |
| JP | 2015099451 | 5/2015 |
| JP | 2015195075 | 11/2015 |
| WO | 2015041305 | 3/2015 |

* cited by examiner

*Primary Examiner* — Paul B Yanchus, III
(74) *Attorney, Agent, or Firm* — Fox Rothschild LLP; Carol E. Thorstad-Forsyth

(57) ABSTRACT

A semiconductor circuit device in which a plurality of target circuits are provided and a control signal for controlling enable and disable is input to each of the plurality of target circuits, the device includes: a gating control circuit provided for each of the plurality of target circuits, in which the control signal to the corresponding target circuit is input and an On signal is output in response to the control signal for enabling the target circuit; and a power gate switch for each of the plurality of target circuits, which is provided on each power line for each of the plurality of target circuits for supplying a driving voltage to the target circuit and turned on by the On signal.

13 Claims, 19 Drawing Sheets

FIG. 7

| | PROCESSING 1 | PROCESSING 2 | PROCESSING 3 | PROCESSING 4 | ... | PROCESSING N-1 | PROCESSING N |
|---|---|---|---|---|---|---|---|
| CIRCUIT UNIT U40 a | ON | ON | ON | OFF | ... | ON | OFF |
| CIRCUIT UNIT U40 b | ON | ON | ON | OFF | ... | ON | OFF |
| CIRCUIT UNIT U40 c | ON | ON | ON | OFF | ... | ON | OFF |
| CIRCUIT UNIT U40 d | ON | ON | ON | ON | ... | OFF | OFF |
| CIRCUIT UNIT U40 e | OFF | ON | ON | ON | ... | OFF | OFF |
| CIRCUIT UNIT U40 f | OFF | ON | ON | ON | ... | OFF | OFF |
| CIRCUIT UNIT U40 g | OFF | ON | ON | ON | ... | ON | OFF |
| CIRCUIT UNIT U40 h | OFF | OFF | ON | OFF | ... | OFF | OFF |
| CIRCUIT UNIT U40 i | OFF | OFF | ON | OFF | ... | OFF | OFF |
| CIRCUIT UNIT U40 j | OFF | OFF | ON | OFF | ... | ON | OFF |
| CIRCUIT UNIT U40 k | OFF | OFF | ON | OFF | ... | ON | OFF |
| CIRCUIT UNIT U40 l | OFF | OFF | ON | OFF | ... | ON | OFF |
| CIRCUIT UNIT U40 m | OFF | OFF | ON | OFF | ... | OFF | OFF |
| CIRCUIT UNIT U40 n | OFF | OFF | ON | OFF | ... | OFF | OFF |
| CIRCUIT UNIT U40 o | OFF | OFF | ON | OFF | ... | OFF | OFF |
| CIRCUIT UNIT U40 p | OFF | OFF | ON | OFF | ... | ON | OFF |

SEMICONDUCTOR CIRCUIT DEVICE

CROSS-REFERENCES TO RELATED APPLICATIONS

This application is a U.S. National Phase Application of PCT International Application No. PCT/JP2022/016880, filed on Mar. 31, 2022, which is an International Application of and claims the benefit of priority to Japanese Patent Application No. 2021-062302, filed on Mar. 31, 2021. The entire contents of these applications are herein incorporated by reference.

TECHNICAL FIELD

The present invention relates to a semiconductor circuit device.

BACKGROUND ART

As a technology of reducing a current leakage to suppress power consumption, power gating for blocking power supply and clock gating for stopping clock supply are known. For example, in a semiconductor device described in PTL 1, a power generation circuit and a clock generation circuit are each connected to a plurality of processor cores including a register, a cache memory, or a non-volatile memory through switches, and the On and Off of the switches is controlled by one controller. In a semiconductor device described in PTL 2, a power voltage is supplied to a memory cell array, a peripheral circuit, and a backup and recovery driving circuit through switches each provided therein, and the On and Off of each of the switches is controlled by one controller.

In a semiconductor circuit device of PTL 3, when performing power gating with respect to a processor and a cache memory, the temperatures of a non-volatile storage circuit retaining data obtained by an arithmetic circuit and the non-volatile storage circuit retained in the cache memory are each detected, whether to perform the setting of an optimal power blocking time or the power block is determined by a controller by using overhead obtained from the detected temperature, and a power gating switch is turned on and off by the controller.

CITATION LIST

Patent Literature

PTL 1: JP-A-2014-2726
PTL 2: JP-A-2015-195075
PTL 3: JP-A-2013-214296
PTL 4: WO 2015/041305
PTL 5: JP-A-2012-69100

SUMMARY OF INVENTION

Technical Problem

As described above, in the semiconductor circuit device performing the power gating or the clock gating, by increasing the number of circuits to be a target, it is possible to more effectively suppress the power consumption. However, as described above, in a case where each gating is controlled by the controller, every time when the number of circuits to be a target increases, it is necessary to change the circuit or the program of the controller in order to attain the gating with respect to the increased circuit, and thus, it is not easy to control the gating in a massive and highly parallel processor system or a SoC system focused on a circuit technology such as a multi-core (for example, a graphics processing unit (GPU), a tensor processing unit (TPU), or the like).

The invention has been made in consideration of the circumstances described above, and an object thereof is to provide a semiconductor circuit device capable of easily and autonomously attaining gating.

Solution to Problem

In order to attain the object described above, the invention is a semiconductor circuit device in which a plurality of target circuits are provided and a control signal for controlling enable and disable is input to each of the plurality of target circuits, the device including: a gating control circuit provided for each of the plurality of target circuits, in which the control signal to the corresponding target circuit is input and an On signal is output in response to the control signal for enabling the target circuit; and a power gate switch for each of the plurality of target circuits, which is provided on each power line for each of the plurality of target circuits for supplying a driving voltage to the target circuit and turned on by the On signal.

Advantageous Effects of Invention

According to the invention, the On and Off of the power gate switch is controlled by using the control signal input to the target circuit, and thus, it is not necessary to change the circuit or the program of the controller in order to attain the power gating and the clock gating, and it is possible to easily attain the gating.

BRIEF DESCRIPTION OF DRAWINGS

FIG. 7 is an explanatory diagram illustrating an example of an On and Off pattern of a circuit unit.

DESCRIPTION OF EMBODIMENTS

First Embodiment

Figure 1:
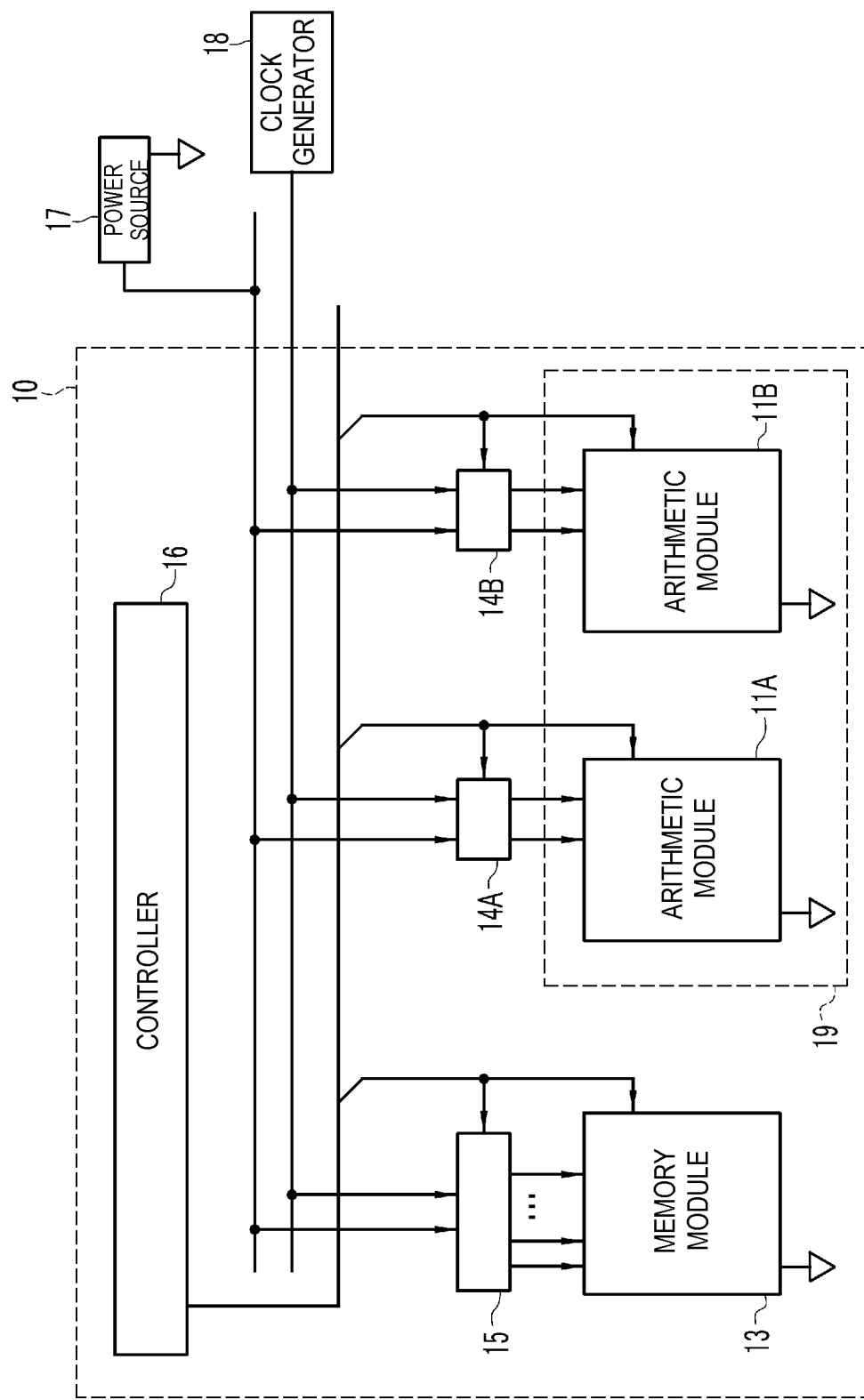
FIG. 1 is a block diagram illustrating an outline of a semiconductor circuit device.

In FIG. 1, a plurality of circuit modules are provided in a semiconductor circuit device 10. In this example, in the semiconductor circuit device 10, arithmetic modules 11A and 11B performing logic arithmetic operation, and a memory module 13 are provided, as a circuit module. In the semiconductor circuit device 10, gating sections 14A, 14B, and 15, and a controller 16 are provided. For example, in the memory module 13, data used for the arithmetic operation of the arithmetic modules 11A and 11B is retained, and an arithmetic result of the arithmetic modules 11A and 11B is written. In this example, one memory module 13 and two arithmetic modules 11A and 11B are provided in the semiconductor circuit device 10, but the invention is not limited thereto, and for example, the number thereof can be any number, and for example, a plurality of modules of either the memory module or the arithmetic module may be provided, and other circuit modules may be further provided.

The arithmetic modules 11A and 11B and the memory module 13 are operated by the supply of a driving voltage from a power source 17 and a clock from a clock generator 18, and enable and disable of the circuit module itself or a circuit therein are controlled by a control signal from the controller 16. Therefore, the arithmetic modules 11A and 11B and the memory module 13 are a target circuit in which the module itself or the circuit therein is subjected to power gating and clock gating. In other words, the target circuit is a circuit to be a target of the power gating and the clock gating, and in the circuit, a control signal from a circuit (in this example, the controller 16) controlling enable and disable of the target circuit through the control signal is input, and enable and disable are controlled by the control signal.

Enable of the circuit module and the circuit is a state where the circuit module and the circuit are active, that is, operated, or a state where the operation is allowed, disable is a state where the circuit module and the circuit are inactive, that is, not operated, or a state where the operation is prohibited, and the control signal is a signal for setting such a state. For example, an enable signal for the circuit module including a latch circuit, a register, or the like, a select signal for designating a memory element or a memory element group decoding an address, and the like are the control signal. A trigger signal for allowing the circuit module or the circuit to start a predetermined operation, a command for instructing the execution of a specific function, and the like can be the control signal.

In this example, as described below, the arithmetic modules 11A and 11B include a register, and the memory module 13 includes a register and a memory array. The controller 16 inputs an enable signal to the arithmetic modules 11A and 11B, and inputs an enable signal and a select signal obtained by decoding a memory address to the memory module 13, as the control signal. The controller 16 may be provided outside the semiconductor circuit device 10.

The gating sections 14A and 14B corresponding to the arithmetic modules 11A and 11B each autonomously perform the power gating and the clock gating with respect to the arithmetic modules 11A and 11B by using the enable signal input to the arithmetic modules 11A and 11B. An arithmetic section 19 of the semiconductor circuit device 10 in this example independently performs the power gating and the clock gating with respect to a plurality of arithmetic modules (in this example, the arithmetic modules 11A and 11B) configuring the arithmetic section 19. The gating section 15 corresponding to the memory module 13 autonomously performs the power gating and the clock gating with respect to the memory module 13 by using the enable signal and the select signal input to the memory module 13.

Figure 2:
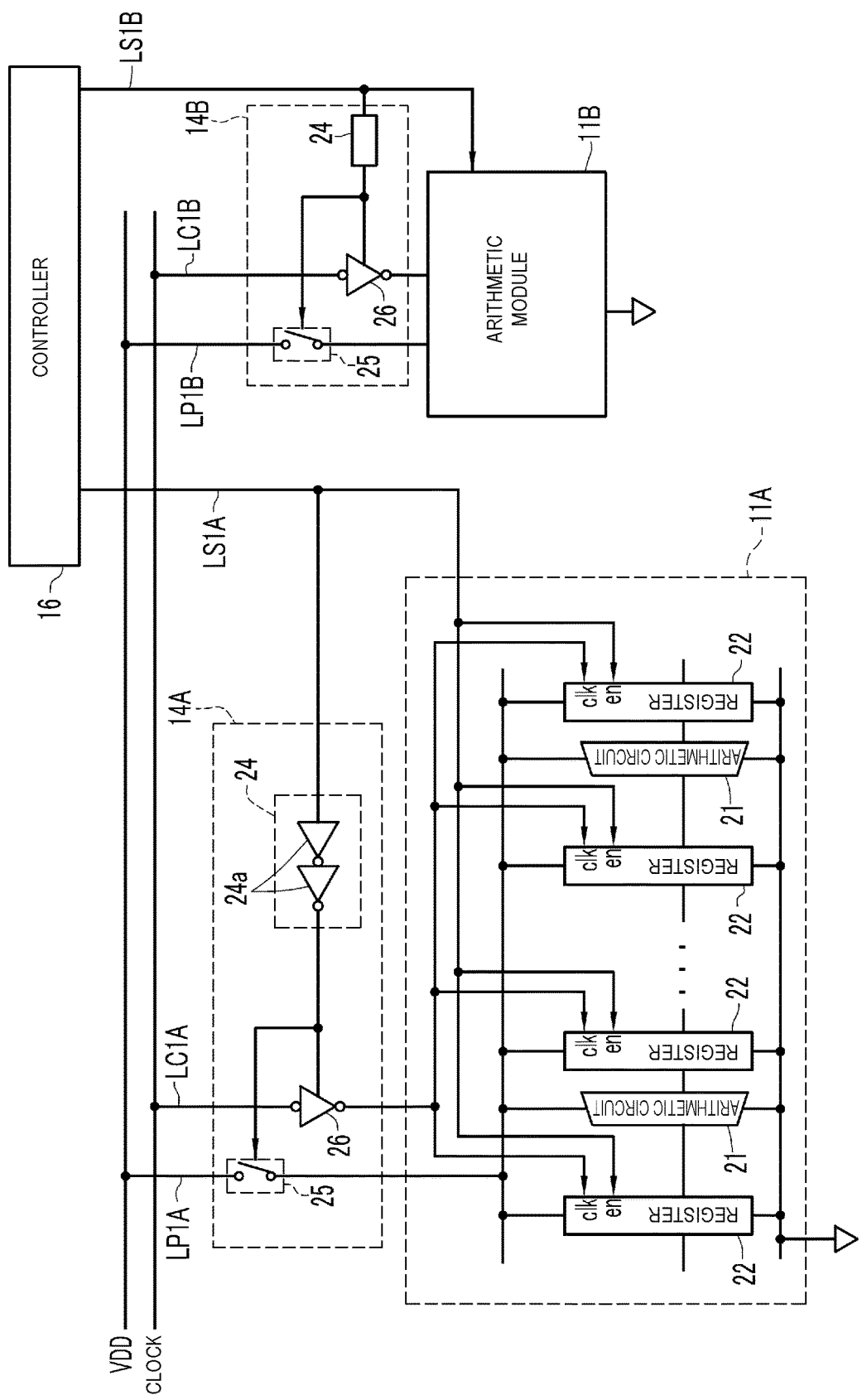
FIG. 2 is a block diagram illustrating a configuration of an arithmetic module and a gating section.

In FIG. 2, the arithmetic module 11A in this example includes a plurality of arithmetic circuits 21 and a plurality of registers 22. Each of the arithmetic circuits 21 is operated by the supply of the driving voltage from the power source 17 through a power line LP1A common to the arithmetic module 11A, and performs logic arithmetic operation with respect to data input from the previous register 22 to output the data to the subsequent register 22.

Each of the registers 22 is operated by the supply of the driving voltage from the power source 17 and the clock from the clock generator 18 through the power line LP1A and a clock line LC1A. The enable signal from the controller 16 is input to each of the registers 22 through a signal line LS1A common thereto. When the driving voltage is supplied and the enable signal is active, each of the registers 22 latches and outputs data of a plurality of bits to be input, in synchronization with the clock. The configuration of the arithmetic module 11A illustrated in FIG. 2 is an example, and the invention is not limited thereto.

The gating section 14A corresponding to the arithmetic module 11A includes a gating control circuit 24, a power gate switch 25, and a clock gate switch 26. In this example, the gating control circuit 24 includes two NOT circuits 24a, which are connected in series. The signal line LS1A is connected to the gating control circuit 24, and the enable signal to be input to the arithmetic module 11A from the controller 16 is input to the gating control circuit 24. When the enable signal is active, the gating control circuit 24 outputs an On signal (activates the output), and when the enable signal is inactive, the gating control circuit 24 outputs an Off signal (inactivates the output). The On signal is output in response to the active enable signal for enabling the arithmetic module 11A, and the Off signal is output in response to the inactive enable signal for disabling the arithmetic module 11A.

The power gate switch 25 is a switch including a MOS transistor or the like, and the On and Off of the power gate switch 25 is controlled by the gating control circuit 24. The power gate switch 25 is provided on the power line LP1A supplying the driving voltage to the arithmetic module 11A, is turned on when the On signal from the gating control circuit 24 is input, and is turned off when the Off signal is input. In this example, the power gate switch 25 is provided on a power potential (VDD) side of the power line LP1A. The power gate switch 25 is turned on, and thus, the driving voltage is supplied to the arithmetic module 11A, and the power gate switch 25 is turned off, and thus, the supply of the driving voltage is blocked. The configuration of the power gate switch 25 is not limited insofar as the supply and the block of the driving voltage can be switched.

The clock gate switch 26 is provided on the clock line LC1A supplying the clock to the arithmetic module 11A. In this example, the clock gate switch 26 includes a tri-state buffer, and the output of the gating control circuit 24 is connected to a control input terminal of the clock gate switch 26 such that the operation of the clock gate switch 26 is controlled by the gating control circuit 24. The clock gate switch 26 is in a conductive state (on) by the On signal of the gating control circuit 24, and supplies the clock from the clock generator 18 to the arithmetic module 11A. The output of the clock gate switch 26 has high impedance by the Off signal of the gating control circuit 24, that is, the clock gate switch 26 is in a non-conductive state (Off), and blocks the clock to the arithmetic module 11A.

The configuration of the arithmetic module 11B is the same as that of the arithmetic module 11A. A driving voltage and a clock are supplied to the arithmetic module 11B through a power line LP1B and a clock line LC1B. The enable signal from the controller 16 is input to the arithmetic module 11B through a signal line LS1B.

The gating section 14B provided corresponding to the arithmetic module 11B has the same configuration as that of the gating section 14A provided corresponding to the arithmetic module 11A, and includes the gating control circuit 24, the power gate switch 25, and the clock gate switch 26. In the gating section 14B, the power gate switch 25 is provided on the power line LP1B, the clock gate switch 26 is provided on the clock line LC1B, the gating control circuit 24 is connected to the signal line LS1B, and the enable signal is input to the arithmetic module 11B from the controller 16.

The arithmetic modules 11A and 11B described above are the target circuit for the power gating and the clock gating by the power gate switch 25 and the clock gate switch 26 that are each turned on and off by the corresponding gating control circuit 24.

Figure 3:
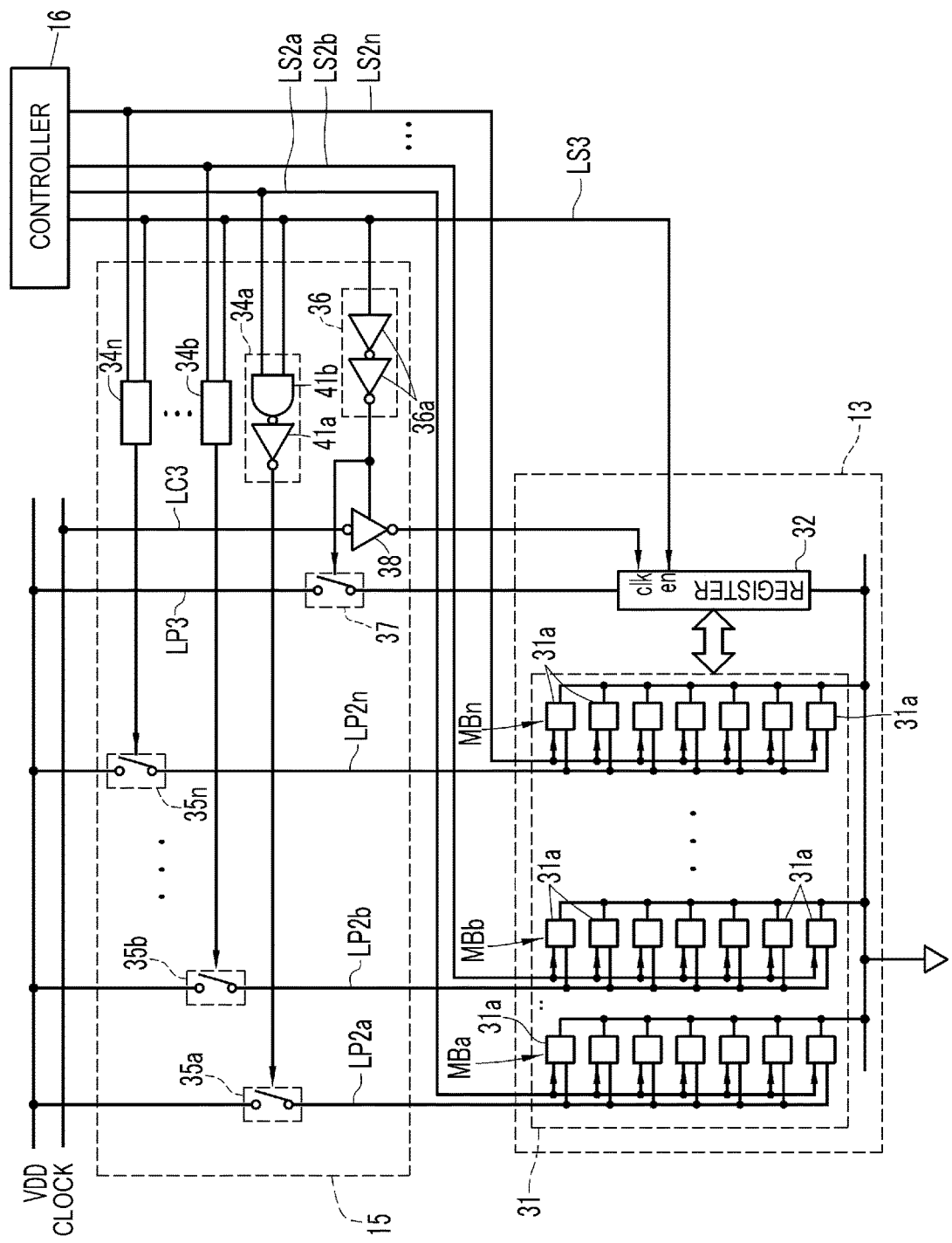
FIG. 3 is a block diagram illustrating a configuration of a memory module and a gating section.

In FIG. 3, the memory module 13 includes a memory array 31 and a register 32. In the memory array 31, a plurality of non-volatile memory cells 31a are arrayed in the shape of a matrix. The memory array 31 is divided into a plurality of memory blocks MBa, MBb . . . . Hereinafter, in a case where the memory blocks MBa, MBb . . . are not particularly distinguished, the memory blocks will be described as a memory block MB. In this example, one memory block MB includes the plurality of memory cells 31a arranged in a row in a vertical direction of FIG. 3. Power lines LP2a, LP2b . . . and signal lines LS2a, LS2b . . . are provided corresponding to each of the memory blocks MBa, MBb . . . . Hereinafter, in a case where the power lines LP2a, LP2b . . . are not particularly distinguished, the power lines will be described as a power line LP2, and in a case where the signal lines LS2a, LS2b . . . are not particularly distinguished, the signal lines will be described as a signal line LS2. It is preferable that the memory cell 31a, for example, includes STT-MRAM using a magnetic tunnel junction (MTJ) element.

Each of the memory cells 31a of each of the memory blocks MB is connected to the power line LP2 and the signal line LS2 corresponding to the memory block MB. The power line LP2 is connected to the power source 17, and a driving voltage is supplied to the memory cell 31a through the power line LP2.

The signal line LS2 is connected to the controller 16, and a select signal as the control signal is input to the memory cell 31a through the signal line LS2. When the select signal is active, the memory cell 31a performs a data reading or writing operation, when the select signal is inactive, the memory cell 31a is not operated. Therefore, in the memory array 31, data reading or writing is selected in memory block unit. The activation and the inactivation of the select signal are controlled by the controller 16, for example, on the basis of an address to be a target of the data reading or writing.

The register 32 is a data input and output register temporarily retaining the data to be written or read out from the memory block MB. The data is input and output between the memory array 31 and the arithmetic modules 11A and 11B through the register 32. The register 32 is operated by the supply of the driving voltage from the power source 17 and the clock from the clock generator 18 through a power line LP3 and a clock line LC3. The enable signal from the controller 16 is input to the register 32 through a signal line LS3. When the driving voltage is supplied and the enable signal is active, the register 32 latches and outputs the data of the plurality of bits to be input, in synchronization with the clock.

The gating section 15 corresponding to the memory module 13 includes gating control circuits 34a, 34b . . . and power gate switches 35a, 35b . . . provided corresponding to each of the memory blocks MBa, MBb . . . , and a gating control circuit 36, a power gate switch 37, and a clock gate switch 38 for the register 32. Hereinafter, in a case where the gating control circuits 34a, 34b . . . are not particularly distinguished, the gating control circuits will be described as a gating control circuit 34, and in a case where the power gate switches 35a, 35b . . . are not particularly distinguished, the power gate switches will be described as a power gate switch 35.

The gating control circuit 34 turns on and off the power gate switch 35 of the corresponding memory block MB. The gating control circuit 34 has a configuration in which a NOT circuit 41a and a NAND circuit 41b are connected in series, and the output of the NOT circuit 41a is the output of the gating control circuit 34. The signal line LS2 of the corresponding memory block MB and the signal line LS3 to the register 32 are connected to the input of the NAND circuit 41b, and the select signal to the corresponding memory block MB and the enable signal to the register 32 are input. Accordingly, when the select signal to the corresponding memory block MB and the enable signal to the register 32 are each active, the gating control circuit 34 outputs the On signal (the output of the NOT circuit 41a is active), when the signals are each inactive, the gating control circuit 34 outputs the Off signal (the output of the NOT circuit 41a is inactive).

The power gate switch 35 is provided on the power line LP2 of the corresponding memory block MB, and the On and Off of the power gate switch 35 is controlled by the gating control circuit 34 of the corresponding memory block MB. The power gate switch 35 is provided on a power potential (VDD) side of the power line LP2. The configuration of the power gate switch 35 is the same as that of the power gate switch 25. The power gate switch 35 is turned on when the On signal from the gating control circuit 34 is input, and is turned off when the Off signal is input. The power gate switch 35 is turned on, and thus, the driving voltage is supplied to each of the memory cells 31a of the corresponding memory block MB, and the power gate switch 35 is turned off, and thus, the supply of the driving voltage is blocked. Therefore, in any memory block MB of the memory array 31, when the select signal to the memory block MB is active and the enable signal to the register 32 is active, the power gate switch 35 is turned on, and the driving voltage is supplied, and thus, reading or writing can be performed.

In this example, as described above, the power gating with respect to the memory block MB is controlled by both of the select signal to the memory block MB and the enable signal to the register 32, and the power gating with respect to the memory block MB may be controlled only by the select signal to the memory block MB.

The power gate switch 37 is provided on the power line LP3, and the clock gate switch 38 is provided on the clock line LC3, in which the On and Off of both of the switches is controlled by the gating control circuit 36 including two NOT circuits 36a, which are connected in series. The power gate switch 37 is provided on a power potential (VDD) side of the power line LP3. The signal line LS3 is connected to the gating control circuit 36.

The gating control circuit 36, the power gate switch 37, and the clock gate switch 38 for the register 32 described above are the same as the gating control circuit 24, the power gate switch 25, and the clock gate switch 26 corresponding to the register 22 of the arithmetic module 11A. Therefore, when the enable signal input to the register 32 is active, the power gate switch 37 and the clock gate switch 38 are each turned on by the On signal from the gating control circuit 36, and the driving voltage and the clock are supplied to the register 32.

The memory module 13 configured as described above itself is the target circuit of the power gating and the clock gating, and each of the memory blocks MB configuring the memory array 31 is the target circuit of the power gating.

In the semiconductor circuit device 10 described above, for example, in a case where the arithmetic module 11A performs the arithmetic operation and the arithmetic module 11B does not perform the arithmetic operation, the controller 16 activates the enable signal to the arithmetic module 11A, and inactivates the enable signal to the arithmetic module 11B. Accordingly, the On signal is output from the gating control circuit 24 of the gating section 14A, and the power gate switch 25 and the clock gate switch 26 are each turned on by the On signal. As a result thereof, the arithmetic module 11A performs the arithmetic operation since the enable signal is active and the driving voltage and the clock are supplied. On the other hand, the Off signal is output from the gating control circuit 24 of the gating section 14B, and thus, the power gate switch 25 and the clock gate switch 26 are each turned off by the Off signal, and the supply of the driving voltage and the clock to the arithmetic module 11B is blocked.

On the contrary, in a case where the arithmetic module 11A does not perform the arithmetic operation and the arithmetic module 11B performs the arithmetic operation, the controller 16 inactivates the enable signal to the arithmetic module 11A, and activates the enable signal to the arithmetic module 11B. Accordingly, in the gating section 14A, the Off signal is output from the gating control circuit 24, and the power gate switch 25 and the clock gate switch 26 are each turned off, and thus, the supply of the driving voltage and the clock to the arithmetic module 11A is blocked. In contrast, in the gating section 14B, the On signal is output from the gating control circuit 24, and the power gate switch 25 and the clock gate switch 26 are each turned on, and thus, the arithmetic module 11B performs the arithmetic operation since the enable signal is active and the driving voltage and the clock are supplied.

In a case where the arithmetic module 11A and the arithmetic module 11B perform the arithmetic operation, the controller 16 activates each of the enable signals to the arithmetic modules 11A and 11B. Accordingly, in each of the gating sections 14A and 14B, the power gate switch 25 and the clock gate switch 26 are each turned on, and thus, the arithmetic modules 11A and 11B perform the arithmetic operation since each of the enable signals is active and the driving voltage and the clock are supplied. In a case where the arithmetic module 11A and the arithmetic module 11B do not perform the arithmetic operation, the controller 16 inactivates each of the enable signals to the arithmetic modules 11A and 11B, and thus, in each of the gating sections 14A and 14B, the power gate switch 25 and the clock gate switch 26 are each turned off, and the supply of the driving voltage and the clock to the arithmetic modules 11A and 11B is blocked.

In the memory module 13, in a case where the data writing or reading is performed with respect to only one memory block MB, the controller 16 activates the select signal to the memory block MB to be a target, and inactivates the select signal of the memory block MB to be a non-target. In order to perform the data writing or reading, the enable signal to the register 32 is activated. Accordingly, each of the select signal and the enable signal input to the gating control circuit 34 corresponding to the memory block MB to be the target is activated, and the On signal is output from the gating control circuit 34. Therefore, the power gate switch 35 corresponding to the memory block MB to be the target is turned on, and the driving voltage is supplied to each of the memory cells 31a of the memory block MB to be the target. As a result thereof, in the memory block MB to be the target, the driving voltage is supplied and the select signal is activated, and thus, the data writing or reading operation is effectively performed. The read data is input to the register 32. In contrast, in the memory block MB to be the non-target, the select signal is inactive, and thus, the data writing or reading operation is not performed, and the supply of the driving voltage is blocked.

In a case where the data reading or writing is not performed, in the memory module 13, the select signal and the enable signal are inactivated, and thus, the power gate switches 35a, 35b . . . , the power gate switch 37, and the clock gate switch 38 are each turned off. As a result thereof, the supply of the driving voltage to each of the memory blocks MB is blocked, and the supply of the driving voltage and the clock to the register 32 is blocked.

As described above, in the semiconductor circuit device 10, the power gating and the clock gating are performed by subdividing the inside of the semiconductor circuit device 10 into the arithmetic modules 11A and 11B and the memory module 13, and in the memory array 31, the power gating is performed by the subdivision for each of the memory blocks, and thus, the power consumption is effectively reduced.

As described above, in the semiconductor circuit device 10, the power gating and the clock gating are performed by subdividing the memory array 31, and the power gating and the clock gating are in a configuration in which the power gate switch and the clock gate switch are turned on and off by inputting the control signal (the enable signal and the select signal) used for controlling enable or disable of the subdivided target circuit (the arithmetic modules 11A and 11B and the memory module 13) to the gating control circuit provided for each of the target circuits, and thus, the power gating and the clock gating are easily attained. For example, in a case where the number of target circuits increases, in accordance with such an increase, the control signal is added, and thus, the power gating and the clock gating are performed with respect to the added target circuit. In a case where an operation timing of the target circuit is changed as with a change in an operation order, in accordance with such a change, the timing of the control signal is changed, and thus, the timing of the power gating and the clock gating of the target circuit is changed. As described above, in the semiconductor circuit device 10, the power gating and the clock gating are performed on the basis of the control signal autonomously input to the target circuit itself, and thus, it is not necessary to change the circuit or the program of the controller 16 in order for the power gating and the clock gating.

Figure 4:
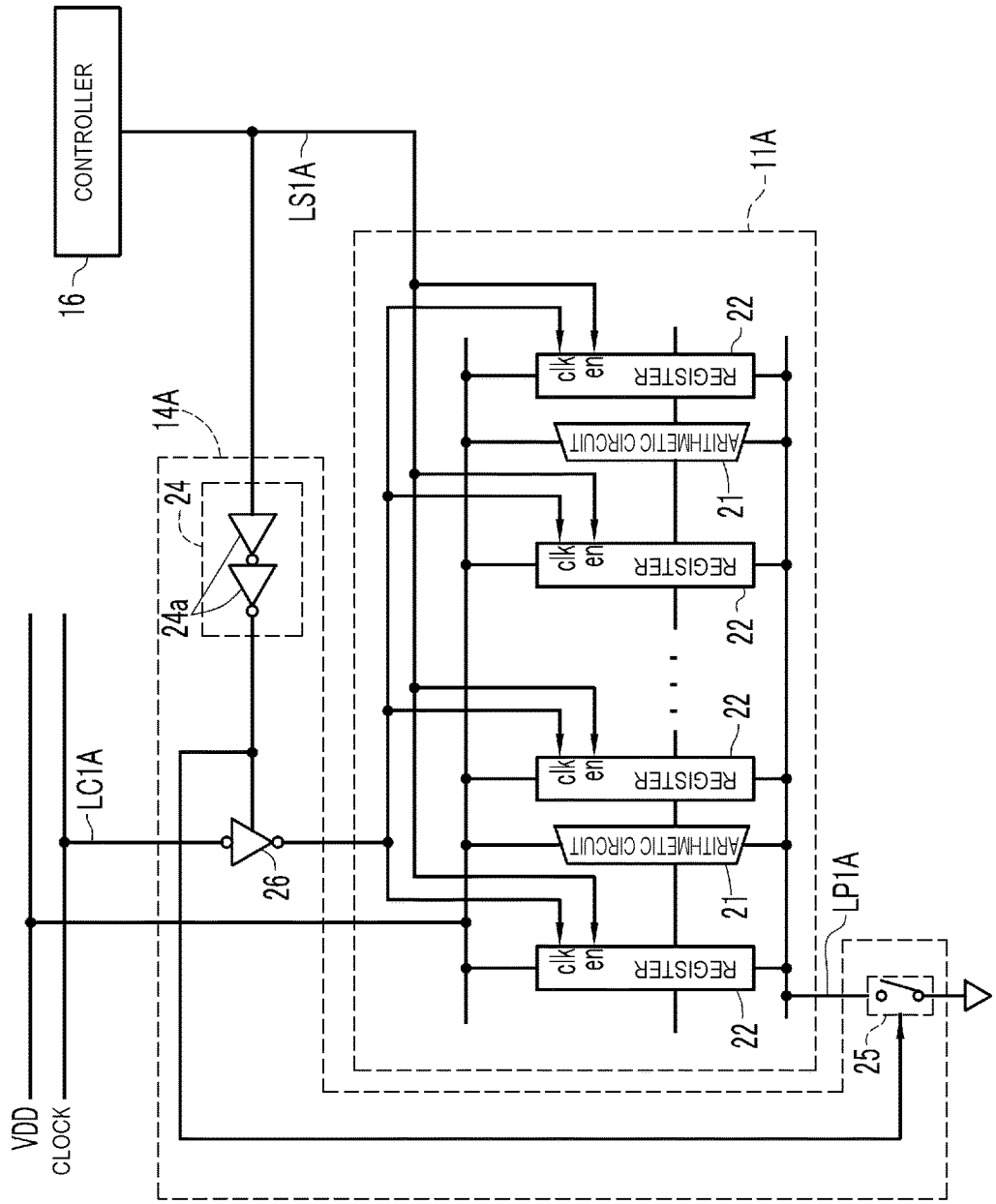
FIG. 4 is a block diagram illustrating an example of performing power gating with respect to an arithmetic module on a reference potential side.
Figure 5:
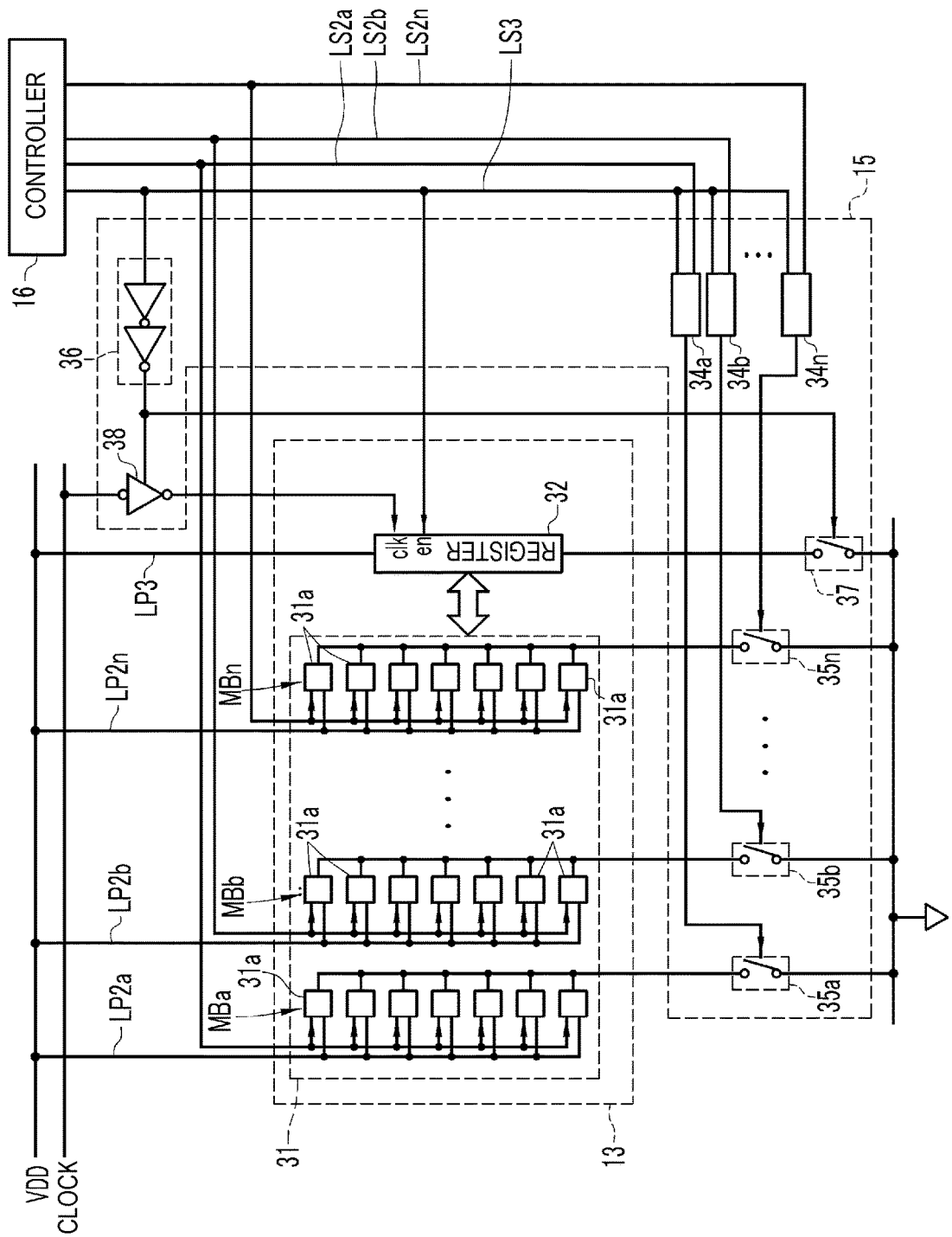
FIG. 5 is a block diagram illustrating an example of performing power gating with respect to a memory module on a reference potential side.

In the example described above, the power gate switch is provided on the power potential (VDD) side of the power line, and may be provided on a reference potential (GND) side of the power line. In the example illustrated in FIG. 4, the power gate switch 25 corresponding to the arithmetic module 11A is provided on a reference potential (GND) side of the power line LP1A, and in the example illustrated in FIG. 5, each of the power gate switches 35 corresponding to each of the memory blocks MB, and the power gate switch 37 corresponding to the register 32 are each provided on a reference potential (GND) side of the power lines LP2 and LP3.

Second Embodiment

In a second embodiment, the power gating and the clock gating are autonomously performed in a semiconductor circuit device performing arithmetic processing corresponding to a neural network.

Figure 6:
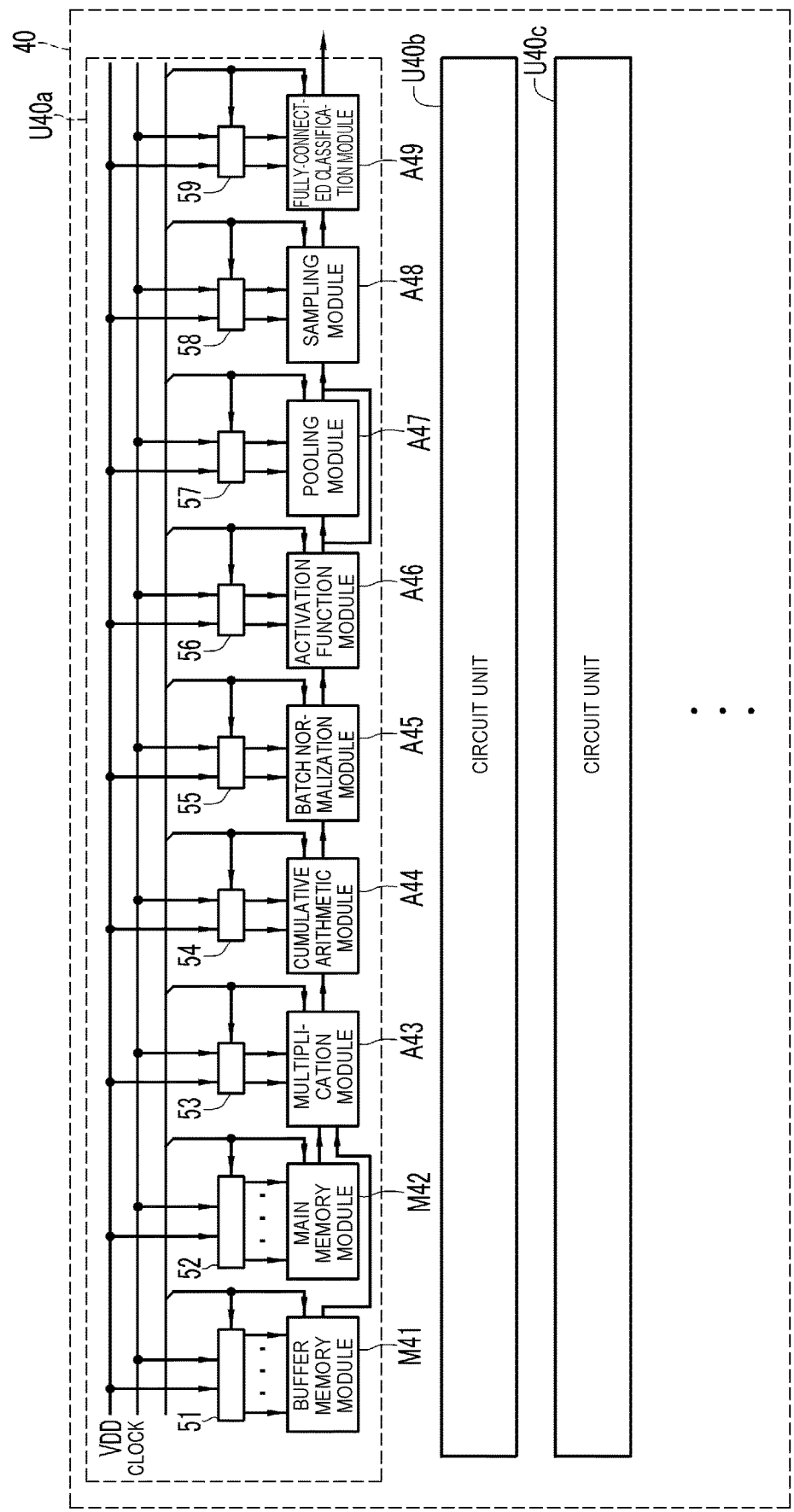
FIG. 6 is a block diagram illustrating an example of a semiconductor circuit device performing arithmetic processing corresponding to a convolutional neural network.

In FIG. 6, a semiconductor circuit device 40 performs arithmetic processing corresponding to a convolutional neural network (CNN). In the semiconductor circuit device 40, a plurality of circuit units U40a, U40b . . . with the same circuit configuration are provided, and the arithmetic processing can be performed in parallel by the circuit units U40a, U40b . . . . As illustrated in an example of FIG. 7, the circuit units U40a, U40b . . . are controlled such that the driving voltage is supplied only to the circuit unit performing the processing in accordance with a processing sequence, and thus, the power consumption of the semiconductor circuit device 40 is reduced. Hereinafter, in a case where the circuit units U40a, U40b . . . are not distinguished, the circuit units will be described as a circuit unit U40.

The circuit units U40a, U40b . . . have the same circuit configuration, and thus, hereinafter, the circuit unit U40a will be described. The circuit unit U40a includes a buffer memory module (hereinafter, referred to as a buffer module) M41, a main memory module M42, a multiplication module A43, a cumulative arithmetic module A44, a batch normalization module A45, an activation function module A46, a pooling module A47, a sampling module A48, and a fully-connected classification module A49, as a circuit module.

The buffer module M41 and the main memory module M42, which are a memory module, have the same configuration as that of the memory module 13 (refer to FIG. 3) of the first embodiment, and include a memory array including a plurality of non-volatile memory cells, and a register. Input data is retained in each memory block of the memory array in the buffer module M41, and filter data (a filter coefficient) of a filter used in the convolutional arithmetic operation is written in each memory block of the memory array in the main memory module M42.

A gating section 51 is provided in the buffer module M41, a gating section 52 is provided in the main memory module M42, and the configuration and the function thereof are the same as those of the gating section 15 (refer to FIG. 3) provided corresponding to the memory module 13 of the first embodiment. Therefore, for example, in the buffer module M41, the power gating with respect to each of the memory blocks, and the power gating and the clock gating with respect to the register are performed by the gating section 51, on the basis of the enable signal input to the register and the select signal input to each of the memory blocks. The same applies to the main memory module M42.

The buffer module M41 is actually a part of a buffer memory section as the memory circuit provided in common to the circuit units U40a, U40b . . . . Similarly, the main memory module M42 is actually a part of a main memory section as the memory circuit provided in common to the circuit units U40a, U40b . . . .

The multiplication module A43, the cumulative arithmetic module A44, the batch normalization module A45, the activation function module A46, the pooling module A47, the sampling module A48, and the fully-connected classification module A49, which are an arithmetic module performing logic arithmetic operation, are connected in series in this order, and configure a pipeline in which arithmetic operation is performed by using data input (acquired) from the previous module, and an arithmetic result is output to the subsequent module. The output of each of the buffer module M41 and the main memory module 42 is input to the multiplication module A43. Hereinafter, in a case where the multiplication module A43, the cumulative arithmetic module A44, the batch normalization module A45, the activation function module A46, the pooling module A47, the sampling module A48, and the fully-connected classification module A49 are not distinguished, the modules described above will be described as an arithmetic module A.

The multiplication module A43 and the cumulative arithmetic module A44 are a convolutional arithmetic module that configures a convolutional arithmetic section corresponding to a convolutional layer of the convolutional neural network, and performs convolutional arithmetic operation using a filter with respect to input data read out from the buffer module M41. The multiplication module A43, for example, includes a plurality of multipliers that are provided in parallel and multiply the input data from the buffer module M41 and the filter data from the main memory module 42 together, and a selector that selects and outputs a multiplication result of each of the multipliers, as an arithmetic circuit. The cumulative arithmetic module A44 includes an adder sequentially adding (cumulating) the multiplication result output from the selector of the multiplication module A43, as an arithmetic circuit.

The batch normalization module A45 corresponds to a batch normalization layer and includes an arithmetic circuit performing batch normalization processing with respect to an output result of the cumulative arithmetic module A44, that is, a convolutional arithmetic result, and the activation function module A46 corresponds to an activation layer and includes an arithmetic circuit performing calculation processing (activation function arithmetic operation), for example, by an activation function such as a step function, a sigmoid function, a rectified linear function (rectified linear unit (ReLU)), a leaky rectified linear function (leaky ReLU), and a hyperbolic tangent function. The pooling module A47 corresponds to a pooling layer and includes an arithmetic circuit performing pooling arithmetic operation (pooling processing) such as maximum pooling and average pooling. The sampling module A48 corresponds to a sampling layer and includes an arithmetic circuit performing sampling processing such as upsampling and downsampling. The fully-connected classification module A49 includes an arithmetic circuit performing processing corresponding to a fully-connected layer (fully-connected classification processing arithmetic operation) of performing multiply-accumulate arithmetic operation with respect to all the previous layers.

The arithmetic module A has the same configuration as that of the arithmetic module 11A (refer to FIG. 2) of the first embodiment. That is, the arithmetic module A includes one or a plurality of arithmetic circuits performing the processing as described above, and a plurality of registers disposed before and after each of the arithmetic circuits, and has a configuration in which the arithmetic circuit performs the arithmetic operation with respect to data output from the previous register, and the subsequent register latches and outputs the arithmetic result, in synchronization with the clock.

Gating sections 53 to 59 are provided in the multiplication module A43, the cumulative arithmetic module A44, the batch normalization module A45, the activation function module A46, the pooling module A47, the sampling module A48, and the fully-connected classification module A49, respectively corresponding thereto. The configuration and the function of the gating sections 53 to 59 are the same as those of the gating section 14A (refer to FIG. 2) provided corresponding to the arithmetic module 11A of the first embodiment. Therefore, for example, in the multiplication module A43, the power gating and the clock gating with respect to each of the registers of the multiplication module A43 are performed by the gating section 53, on the basis of the enable signal input to such registers. Accordingly, only in a case where the multiplication module A43 performs the arithmetic operation, the driving voltage and the clock are supplied to each of the registers of the multiplication module A43.

The activation and the inactivation of each of the select signal and the enable signal with respect to the buffer module M41, the main memory module M42, and each of the arithmetic modules A are switched by a controller (not illustrated) at a predetermined timing according to the processing sequence of the convolutional neural network. The power gating and the clock gating of the buffer module M41, the main memory module M42, and each of the arithmetic modules A are performed. In the buffer module M41 and the main memory module M42, the driving voltage is supplied only to the memory block from which the input data and the filter data are read out, and the driving voltage and the clock are supplied to the register only during a period in which the data is read out. In the arithmetic module A, the driving voltage and the clock are supplied only while data from the previous module is latched by the register on the input side, and the arithmetic operation is performed by the arithmetic circuit using the latched data, and the arithmetic result is latched by the register on the output side and output to the subsequent module.

Figure 8:
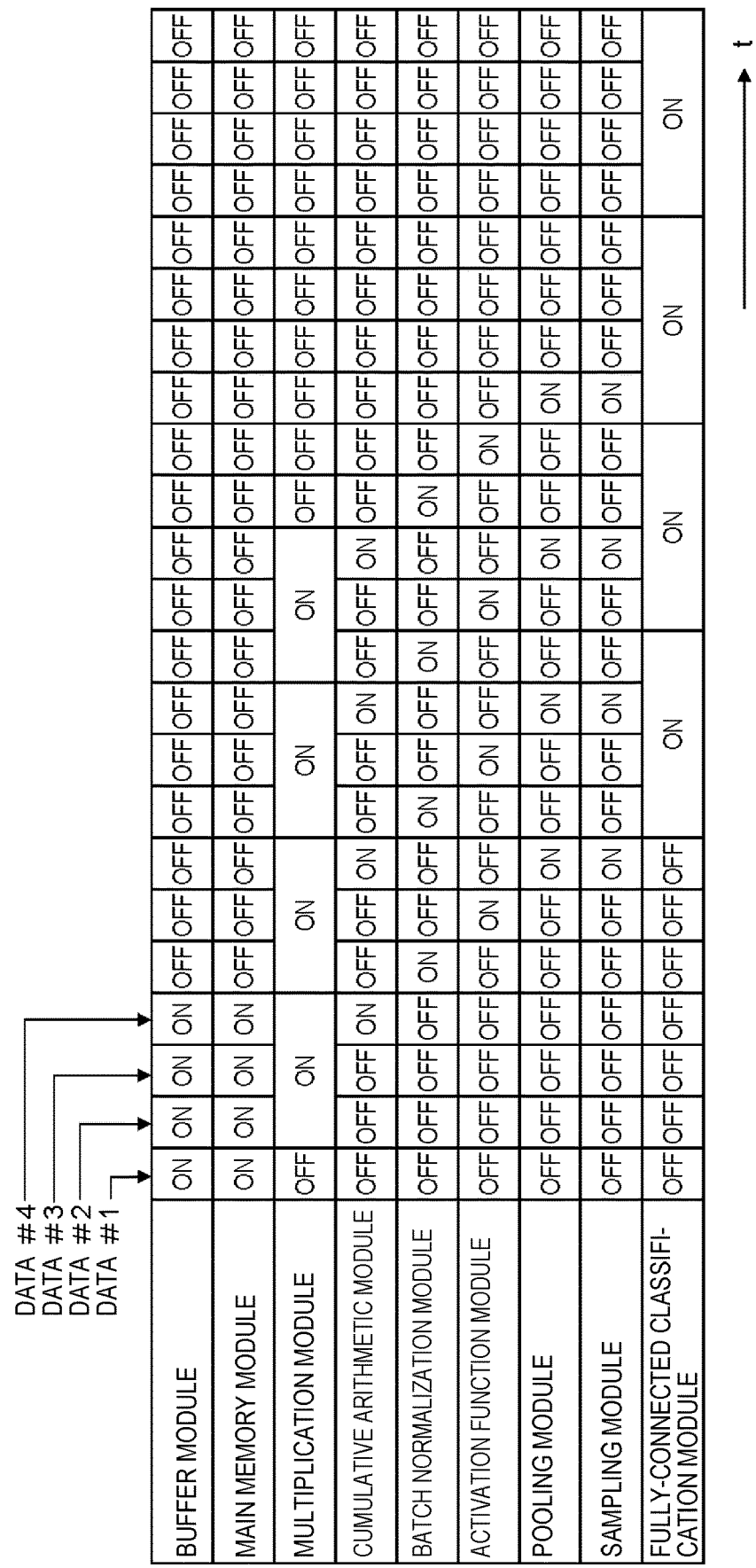
FIG. 8 is an explanatory diagram illustrating an example of an On and Off pattern of a circuit module according to a processing sequence corresponding to a convolutional neural network.

FIG. 8 illustrates the state of the power gating and the clock gating of the buffer module M41, the main memory module M42, and the arithmetic module A when four input data pieces (#1 to #4) are read out from the buffer module M41 and processed. In FIG. 8, a horizontal direction of a table indicates the lapse of time, "ON" in the table indicates that the driving voltage or the driving voltage and the clock are supplied to operate the module, and "OFF" indicates that the driving voltage or the driving voltage and the clock are not supplied. For example, the timing of the power gating and the clock gating of the previous module and the subsequent module is synchronized with the clock, and in order for the subsequent module proceeding to "ON" to receive the data from the previous module proceeding to "OFF", the register latches the data from the previous module on the edge of the clock input thereto.

In the example of FIG. 8, the processing in each of the modules is performed for one input data piece by one cycle, and the processing may be performed for one input data piece by any number of one or more cycles. The processing is simultaneously performed with respect to four input data pieces, and the number of data pieces to be simultaneously processed can be any number of one or more.

As described above, in the pipeline, since the circuit module in each stage is independently operated, the power consumption is effectively reduced by the subdivision in each module unit, as with the circuit unit U40. Since a control signal (the enable signal and the select signal) used to control enable or disable of the target circuit (the buffer module M41, the main memory module M42, and each of the arithmetic modules A) is input to the gating control circuit provided for each of the target circuits, and the On and Off of the power gate switch and the clock gate switch is performed, even in a case where the number of circuit modules in the circuit unit U40 increases, and even in a case where the circuit unit U40 of the semiconductor circuit device 40 increases, the power gating and the clock gating are easily attained.

Figure 9:
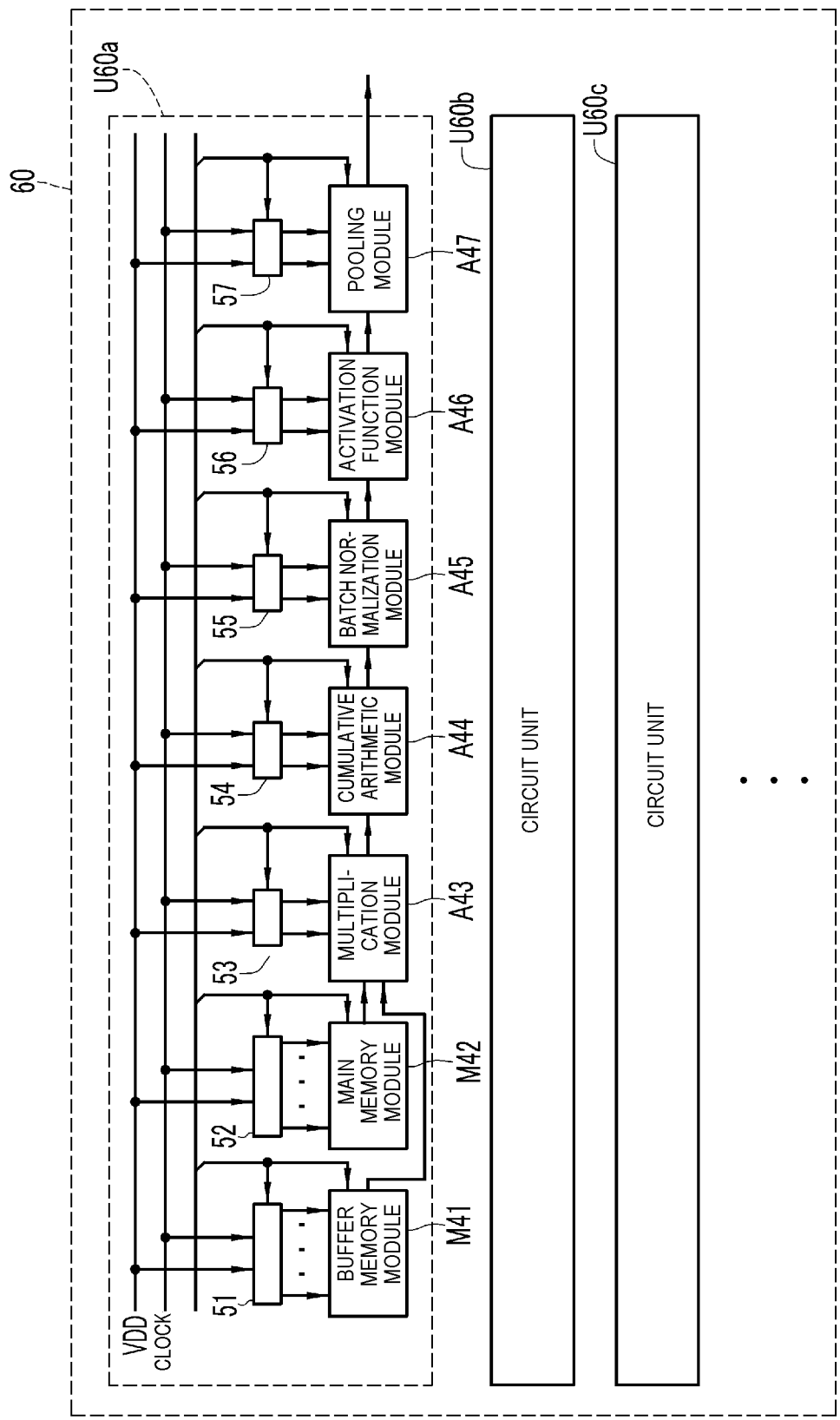
FIG. 9 is a block diagram illustrating an example of a semiconductor circuit device performing arithmetic processing corresponding to a fully convolutional neural network.

A semiconductor circuit device 60 illustrated in FIG. 9 performs arithmetic processing corresponding to a fully convolutional neural network (a fully convolutional network: FCN). In the semiconductor circuit device 60, a plurality of circuit units U60a, U60b . . . having the same circuit configuration are provided, and the arithmetic processing can be performed in parallel by the circuit units U60a, U60b . . . . The circuit units U60a, U60b . . . are controlled such that the driving voltage and the clock are supplied only to the circuit unit performing the processing in accordance with a processing sequence, and thus, the power consumption of the semiconductor circuit device 60 is reduced. Hereinafter, in a case where the circuit units U60a, U60b . . . are not distinguished, the circuit units will be described as a circuit unit U60.

The circuit units U60a, U60b . . . have the same circuit configuration, and thus, hereinafter, the configuration of the circuit unit U60a will be described. The circuit unit U60a has the same configuration as that of the circuit unit U40a, except that the sampling module A48 and the fully-connected classification module A49 are not provided. Therefore, the circuit unit U60a includes the buffer module M41, the main memory module M42, the multiplication module A43, the cumulative arithmetic module A44, the batch normalization module A45, the activation function module A46, and the pooling module A47, which are connected in series. In the semiconductor circuit device 60, the buffer module M41 and the main memory module M42 are also a part of the buffer memory section and the main memory section as the memory circuit provided in common to each of the circuit units U40a, U40b . . . . In this example, bit adjustment modules (not illustrated) adjusting a bit number of an arithmetic result of fixed-point arithmetic processing are each provided immediately after the cumulative arithmetic module A44 and immediately after the activation function module A46. An arithmetic result of the cumulative arithmetic module A44 and an arithmetic result of the activation function module A46 are each input to the subsequent module by decreasing the bit number with the bit adjustment module.

Figure 10:
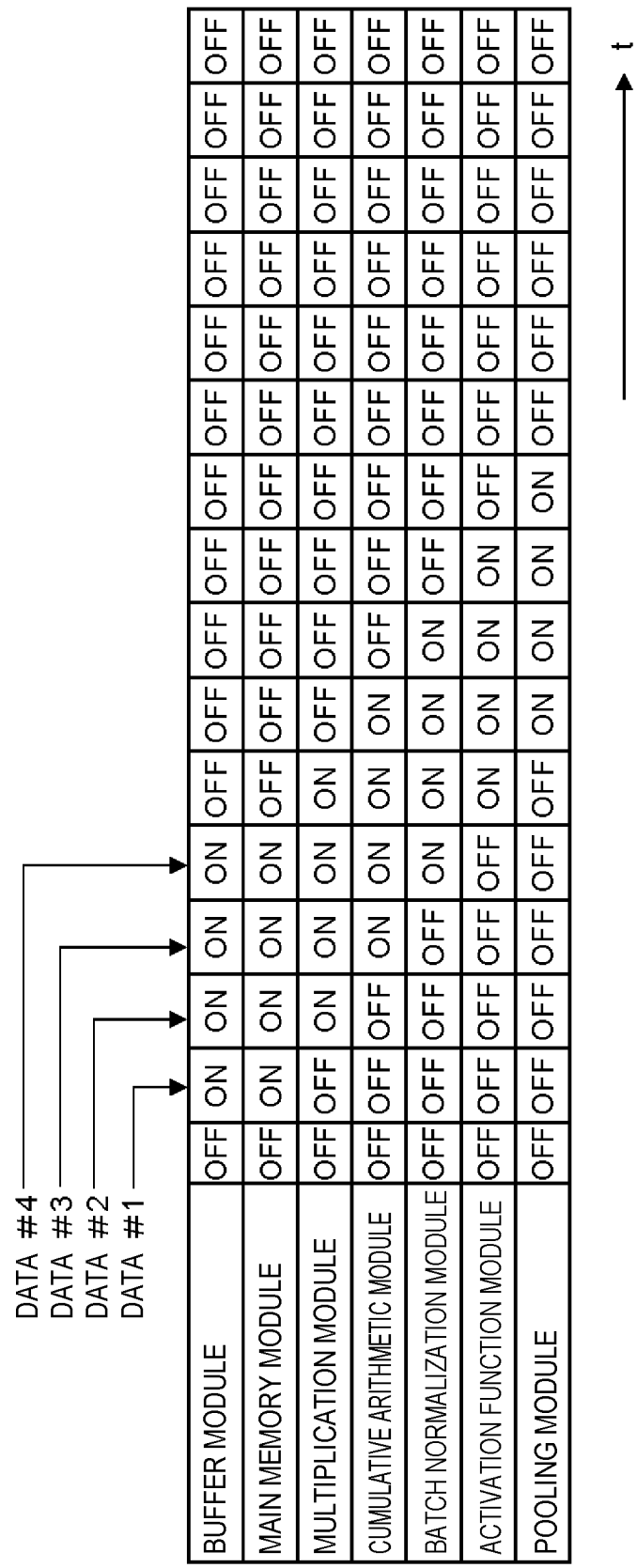
FIG. 10 is an explanatory diagram illustrating an example of an On and Off pattern of a circuit module according to a processing sequence corresponding to a fully convolutional neural network.

Gating sections 51 to 57 are provided corresponding to each of the circuit modules. The function and the operation of the gating sections 51 to 57 are the same as those of the circuit unit U40a, and thus, the power gating and the clock gating are autonomously performed with respect to the buffer module M41, the main memory module M42, the multiplication module A43, the cumulative arithmetic module A44, the batch normalization module A45, the activation function module A46, and the pooling module A47. FIG. 10 illustrates the state of the power gating and the clock gating of the buffer module M41, the main memory module M42, and each of the arithmetic modules A when four input data pieces are read out from the buffer module M41 and processed, as with FIG. 8.

Figure 11:
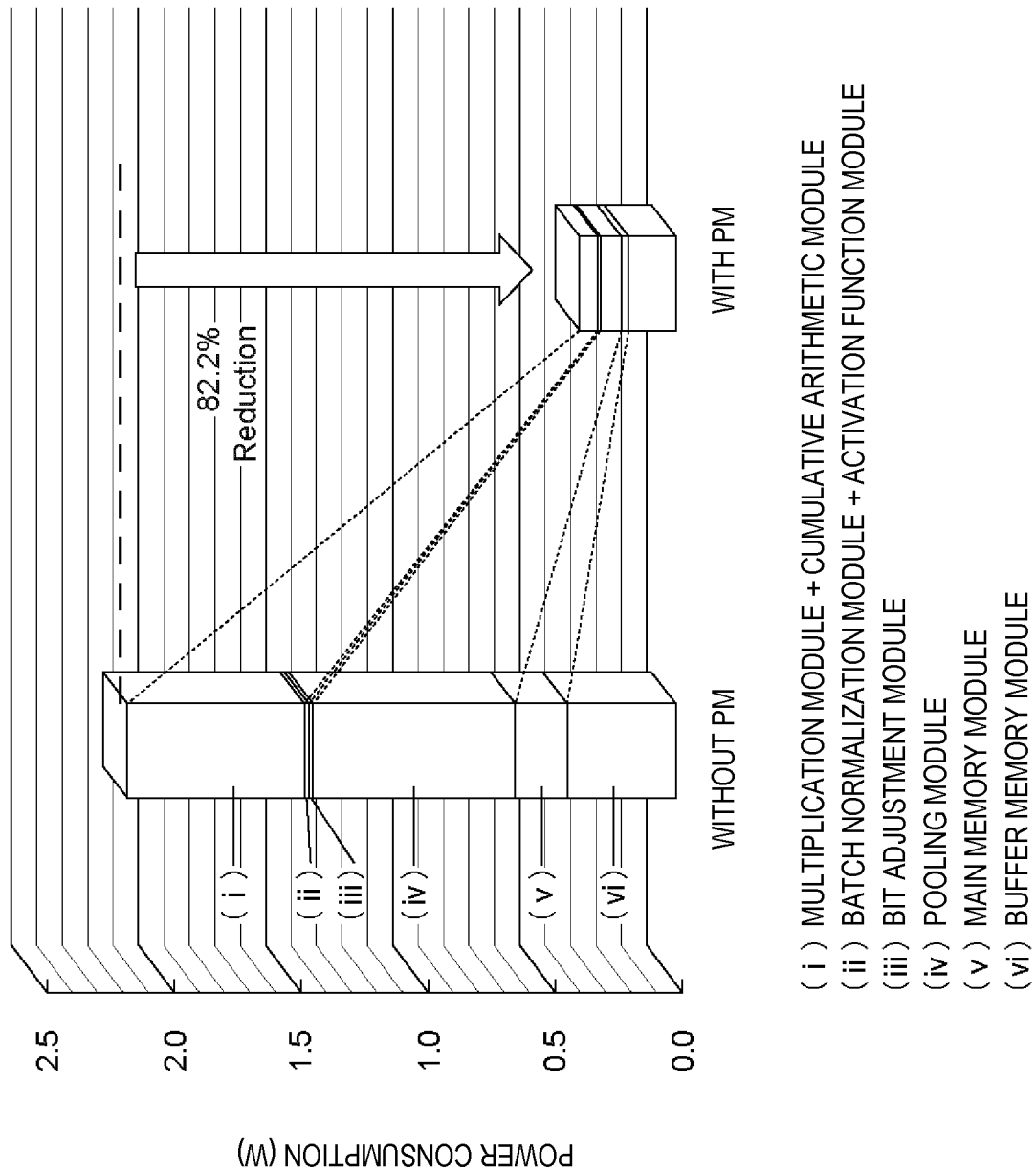
FIG. 11 is a graph illustrating a result of simulating an improvement effect of power performance in a semiconductor circuit device.

A graph in FIG. 11 illustrates a result of simulating an improvement effect of power performance in the semiconductor circuit device 60 described above. Each of the circuit modules basically has a circuit configuration using CMOS, and each memory cell of the buffer module M41 and the main memory module M42 has a non-volatile circuit configuration using a magnetic tunnel junction (MTJ) element. A simulation is performed with respect to a case where 64 circuit units U60 are provided, and the overall operating rate without a standby time is 100%. The overall operating rate is a ratio (%) of an operating time of the semiconductor circuit device 60.

In the graph, a left side ("without PM") illustrates the power consumption and the breakdown thereof in a case where the power gating and the clock gating (CG) are not performed, and a right side ("with PM") illustrates a case where the power gating and the clock gating are performed as described above. In the breakdown, (i) is the power consumption of the convolutional arithmetic module including the multiplication module A43 and the cumulative arithmetic module A44, (ii) is the sum of the power consumption of the batch normalization module A45 and the activation function module A46, and (iii) is the sum of the power consumption of the bit adjustment modules each provided immediately after the cumulative arithmetic module A44 and the activation function module A46. (iv) is the power consumption of the pooling module A47, (v) is the power consumption of the main memory module M42, and (vi) is the power consumption of the buffer memory module M41. According to such a result, in the semiconductor circuit device 60, in a case where the power gating and the clock gating are performed as described above, 82.2% of a reduction in the power consumption is checked.

Figure 12:
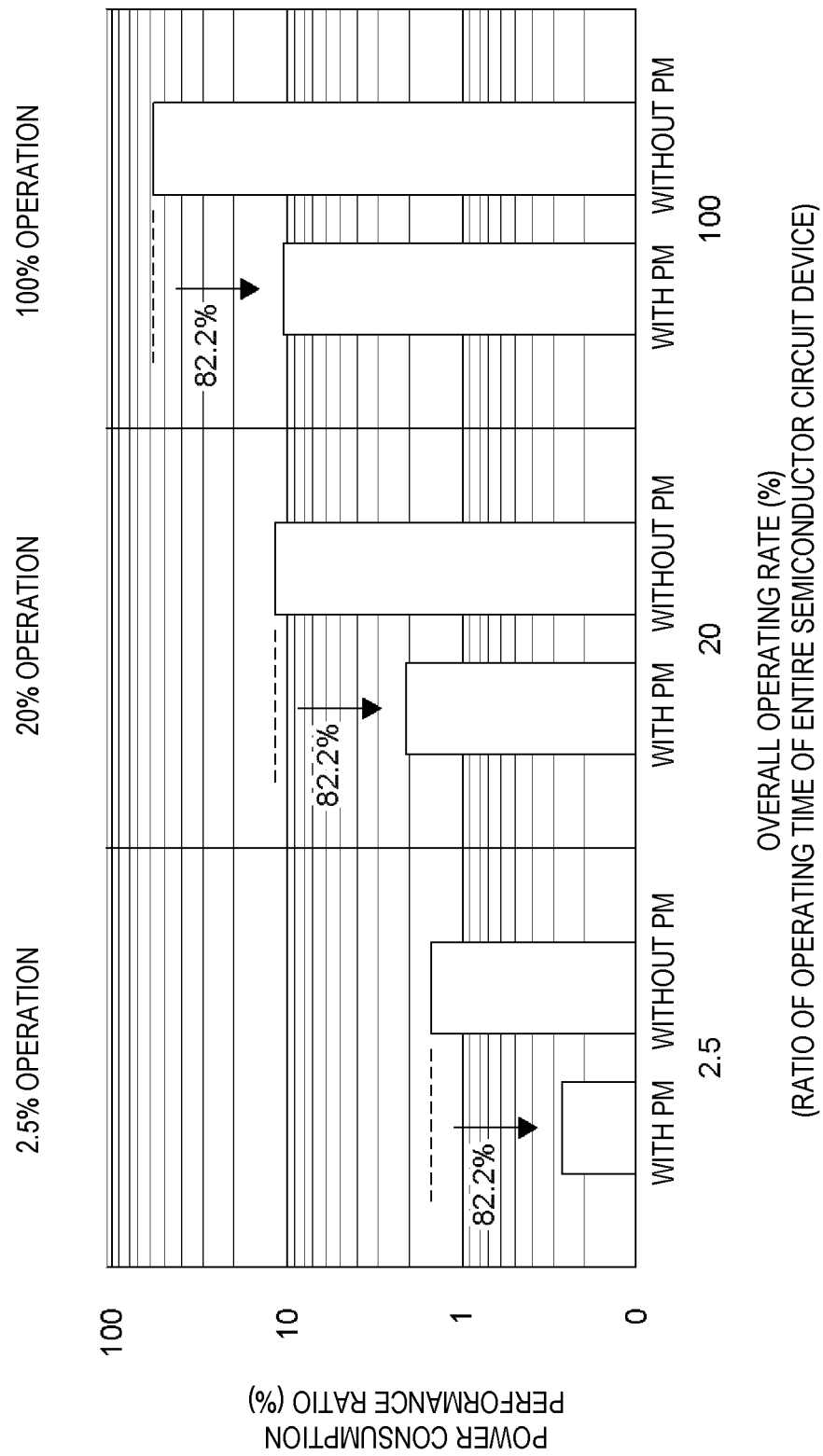
FIG. 12 is a graph illustrating a result of simulating a change in a power consumption performance ratio for different overall operating rates.

In the semiconductor circuit device 60 described above, a case is assumed in which a ratio of the standby time is changed, and a result of simulating a change in a power consumption performance ratio (%) for different overall operating rates is illustrated in FIG. 12. In the simulation, the overall operating rate of 100% without the standby time obtained by assuming the case of being applied to the automated driving or the like of a vehicle, the overall operating rate of 20% obtained by assuming the case of being applied to edge surveillance or the like, and the overall operating rate of 2.5% obtained by assuming the case of being applied to a sensor network or the like are examined, and a case where the power gating and the clock gating are performed (with PM) is compared with a case where the power gating and the clock gating are not performed (without PM). The power consumption performance ratio is a power consumption ratio (%) based on a case (100%) where the power gating and the clock gating are not performed when each memory is SRAM of CMOS in the same configuration as that of the semiconductor circuit device 60, and a case where the power gating and the clock gating are performed in the semiconductor circuit device 60 (with PM) and a case where the power gating and the clock gating are not performed (without PM) are examined. As a result of the simulation, in a case where the power gating and the clock gating are performed, it is checked that the power consumption performance ratio was improved by 82.2% at all the operating rates, and superiority is exhibited, compared to a case where the power gating and the clock gating are not performed.

In the above description, an example has been described in which the arithmetic processing corresponding to the neural network is performed by the pipeline, but even in a configuration where the other arithmetic processing is performed by the pipeline, it is possible to perform the power gating and the clock gating with the gating section provided corresponding to the circuit module in each stage of the pipeline by using the circuit module as the target circuit.

Third Embodiment

In a third embodiment, the power gating and the clock gating are autonomously performed with respect to a semiconductor circuit device performing clustering.

Figure 13:
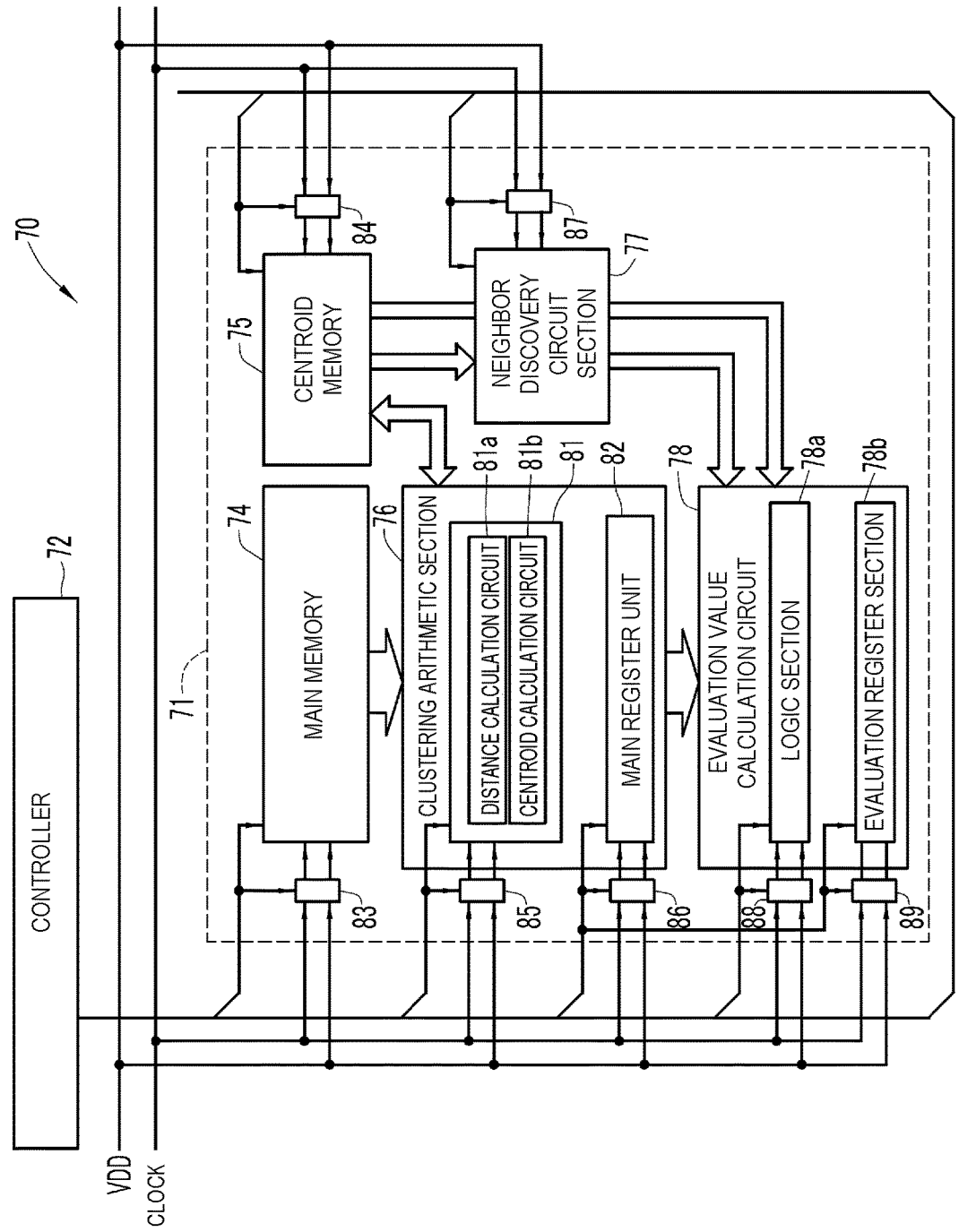
FIG. 13 is a block diagram illustrating a configuration of a semiconductor circuit device performing clustering.

In FIG. 13, a clustering device 70 performs clustering on a plurality of element data pieces. Examples of the clustering performed by the clustering device 70 include batch processing (offline processing) and high-speed classification processing (online processing). The details thereof will be omitted, but the batch processing is processing of performing clustering using all the element data pieces while changing the number of clusters to obtain an evaluation value for each number of clusters, determining the optimal number of clusters from the evaluation value, and classifying the element data with the optimal number of clusters, and is so-called "unsupervised learning". As a clustering method, for example, a k-means method is used, and the number of clusters at which the evaluation value is maximized is the optimal number of clusters. The high-speed classification processing is processing of efficiently and quickly classifying new element data that is added in the case of adding the new element data after the batch processing or in the case of recognizing the new element data by using the result of the batch processing into the existing clusters.

The clustering device 70 includes a semiconductor circuit device 71 performing arithmetic operation for the clustering, and a controller 72 controlling the operation of the semiconductor circuit device 71. The controller 72 outputs various control signals such as the enable signal to each section of the semiconductor circuit device 71. The semiconductor circuit device 71 includes a main memory 74, a centroid memory 75, a clustering arithmetic section 76, a neighbor discovery circuit section 77, and an evaluation value calculation circuit 78.

The main memory 74 stores the plurality of element data pieces to be the target of the clustering. In the main memory 74, a plurality of unit blocks (memory blocks) are arranged into the shape of a matrix, and the element data is retained in the main memory 74 by writing a vector component, which is a component for each dimension, in the unit block. The main memory 74 reads out and outputs the vector component for each of the stored element data pieces in parallel one dimension at a time, in synchronization with the clock.

For example, in a case where the element data is n-dimensional data, and the main memory 74 stores up to m element data pieces, in the main memory 74, m memory modules including n memory blocks having the same configuration as that in the first embodiment are provided in parallel, and the unit blocks are provided in the shape of a matrix of m columns and n rows. The vector component of the element data is stored in each of the unit blocks, and one element data piece is stored in n unit blocks for 1 column, that is, one memory module. When performing reading, for example, while sequentially selecting rows one row at a time, the vector component of each of the memory blocks of the selected row is output, in accordance with a row select signal from the controller 72.

The centroid memory 75 stores the cluster centroid of each of the clusters, and has the same configuration as that of the main memory 74, and for example, it is possible to select the cluster centroid to be read out by selecting any memory module in accordance with a column select signal. In the centroid memory 75, each of the vector components for the cluster centroid is read out for each of the cluster centroids one dimension at a time, and the cluster centroid calculated by the clustering arithmetic section 76 is written, in synchronization with the clock. The main memory 74 and the centroid memory 75 are configured as a non-volatile memory.

The clustering arithmetic section 76 performs various calculations of the clustering of the batch processing, the classification of each of the element data pieces to the clusters, and the like. Such a clustering arithmetic section 76 includes an arithmetic unit 81 and a main register unit 82. The arithmetic unit 81 performs the main arithmetic operation of the clustering, and includes a distance calculation circuit 81a calculating a distance between the element data and the cluster centroid in parallel for the element data, and a centroid calculation circuit 81b calculating the cluster centroid or the data centroid of all of the element data pieces. The main register unit 82 includes various registers or the like temporarily retaining the distance between element data and the cluster centroid, which is calculated by the arithmetic unit 81, a cluster ID allocated to the element data, and the like. The arithmetic unit 81 and the main register unit 82 perform the arithmetic operation, in synchronization with the clock, and latch the distance or the cluster ID.

When performing the high-speed classification processing, the neighbor discovery circuit section 77 specifies a cluster in which a distance between new element data to be added and the data centroid is minimized, and classifies the new element data to the specified cluster. The neighbor discovery circuit section 77 includes a calculation section calculating a distance between the data centroids with respect to each of the cluster centroids sequentially read out from the new element data and the centroid memory 75, a close-range CID register section sequentially updated to the cluster ID in which the distance between the data centroids is minimized during the calculation, and the distance between the data centroids, on the basis of a calculation result of the calculation section, and a close-range register section. The cluster ID finally retained in the close-range CID register section is the cluster ID of the cluster to which the new element data is classified. The calculation section of the neighbor discovery circuit section 77 is also used when calculating the evaluation value for the number of clusters. The neighbor discovery circuit section 77 performs the arithmetic operation, the latch to the register, and the like, in synchronization with the clock.

The evaluation value calculation circuit 78 calculates the evaluation values when each clustering in the batch processing is ended and when the high-speed classification processing is performed, respectively. The evaluation value calculation circuit 78 is broadly divided into a logic section 78a and an evaluation register section 78b. The logic section 78a calculates the evaluation value by a predetermined calculating formula, using the number of element data pieces, the number of clusters, the distance between the element data and the cluster centroid, and the like. When performing the high-speed classification processing, the logic section 78a calculates the cluster centroid to which the new element data is classified, and writes the cluster centroid in the centroid memory 75. The logic section 78a performs the calculation of the evaluation value, and the like.

The evaluation register section 78b retains data required for the calculation of the evaluation value, for example, the data centroid calculated by the centroid calculation circuit 81b, the number of element data pieces of each of the clusters, and data that is obtained in the middle of the arithmetic operation of the centroid calculation circuit 81b and can be used in the calculation of the evaluation value. The evaluation register section 78b latches or outputs the data, in synchronization with the clock.

In the semiconductor circuit device 71, the main memory 74 and the centroid memory 75 are non-volatile, and it is preferable that all or a part of various registers are a non-volatile register. In this example, the main memory 74 and the centroid memory 75 are each a memory circuit. The arithmetic unit 81 of the clustering arithmetic section 76, the neighbor discovery circuit section 77, and the logic section 78a of the evaluation value calculation circuit 78 are each an arithmetic module performing the arithmetic operation for the clustering of classifying the plurality of element data pieces into a plurality of clusters, and the main register unit 82 of the clustering arithmetic section 76 is an intermediate result storage section storing an intermediate result in the middle of the arithmetic operation for the clustering.

In the clustering device 70, by operating the main memory 74, the centroid memory 75, the clustering arithmetic section 76, the neighbor discovery circuit section 77, and the evaluation value calculation circuit 78 described above, or the circuits inside in a predetermined order or combination, the optimal clustering is performed with respect to all the element data by the batch processing, and the new element data is classified to the existing cluster by the high-speed classification processing. The configuration of the clustering device 70, and the details of the batch processing and the high-speed classification processing are the same as those of batch processing and update processing described in WO 2020/161845.

In the semiconductor circuit device 71, the main memory 74, the centroid memory 75, the arithmetic unit 81, the main register unit 82, the logic section 78a, the evaluation register section 78b, and the neighbor discovery circuit section 77 are each the target circuit for the power gating and the clock gating, and gating sections 83 to 89 are provided correspondingly thereto. The configuration and the function of the gating sections 83 to 89 are the same as those of the gating section 14A (refer to FIG. 2) provided corresponding to the arithmetic module 11A of the first embodiment.

The row select signal for designating the row to be read out, the enable signal for the data input and output register provided in the memory module or in common to each of the memory modules, and the like are input to the main memory 74, as the control signal. In the gating section 83 corresponding to the main memory 74, for example, the row select signal is input, and the power gating and the clock gating with respect to the main memory 74 are performed in accordance with the activation and inactivation of the row select signal.

The column select signal for designating the column (the cluster centroid) to be read out, the enable signal for the data input and output register provided in the memory module or in common to each of the memory modules, and the like are input to the centroid memory 75, as the control signal. In the gating section 84 corresponding to the centroid memory 75, for example, the column select signal is input, and the power gating and the clock gating with respect to the centroid memory 75 are performed in accordance with the activation and inactivation of the column select signal.

The main memory 74 and the centroid memory 75 may be subjected to the power gating and the clock gating by the gating sections 83 and 84 using the enable signal input to the data input and output register.

The enable signal and the like for the arithmetic circuit such as the adder, the register, and the like, which configure the distance calculation circuit 81a or the centroid calculation circuit 81b, are input to the arithmetic unit 81, as the control signal, and for example, one of the enable signals is input to the gating section 85. The gating section 85 performs the power gating and the clock gating with respect to the arithmetic unit 81, on the basis of the input enable signal.

The neighbor discovery circuit section 77, the logic section 78a, and the gating sections 87 and 88 corresponding thereto are also similar to the gating section 85. The gating sections 87 and 88 perform the power gating and the clock gating with respect to the neighbor discovery circuit section 77 and the logic section 78a by the control signal input to each of the neighbor discovery circuit section 77 and the logic section 78a, for example, the enable signal.

In the main register unit 82, the enable signal as the control signal is input to each of the registers configuring the main register unit 82, and the enable signal is input to the gating section 86. Accordingly, the gating section 86 performs the power gating and the clock gating with respect to the main register unit 82 by the enable signal input to the main register unit 82.

The enable signal input to the gating section 86 is also input to the gating section 89 corresponding to the evaluation register section 78b. Accordingly, the evaluation register section 78b is subjected to the power gating and the clock gating by the gating section 89, at the same timing as that of the main register unit 82. This is because it is sufficient that the main register unit 82 and the evaluation register section 78b are operated at the same timing. By inputting the control signal input to the evaluation register section 78b, for example, the enable signal to the gating section 89 corresponding to the evaluation register section 78b, the power gating and the clock gating with respect to the evaluation register section 78b may be performed. As described above, in a case where there are two circuits performing the power gating and the clock gating at the same timing, even when one of the circuits is a circuit to which the control signal is not input, it is possible to perform the power gating and the clock gating by using the control signal input to the other circuit. In other words, such two circuits can be considered as one target circuit for the power gating and the clock gating.

For example, in the arithmetic unit 81, the power gating and the clock gating with respect to the arithmetic unit 81 are performed by the gating section 85, on the basis of the enable signal input to the arithmetic unit 81. As described above, since the same enable signal is input to the main register unit 82 and the evaluation register section 78b, the main register unit 82 and the evaluation register section 78b are simultaneously subjected to the power gating and the clock gating.

As described above, in the semiconductor circuit device 71, the power gating and the clock gating are performed with respect to each section obtained by subdividing the semiconductor circuit device 71, and thus, the power consumption is effectively reduced. The control signal (the enable signal, the column select signal, the row select signal, and the like) used to control enable or disable of the main memory 74, the centroid memory 75, the arithmetic unit 81, the main register unit 82, the logic section 78a, the evaluation register section 78b, and the neighbor discovery circuit section 77, which are the target circuit, is input to the gating control circuit provided for each of the target circuits such that the power gate switch and the clock gate switch are turned on and off, and thus, the power gating and the clock gating are easily attained.

Figure 14:
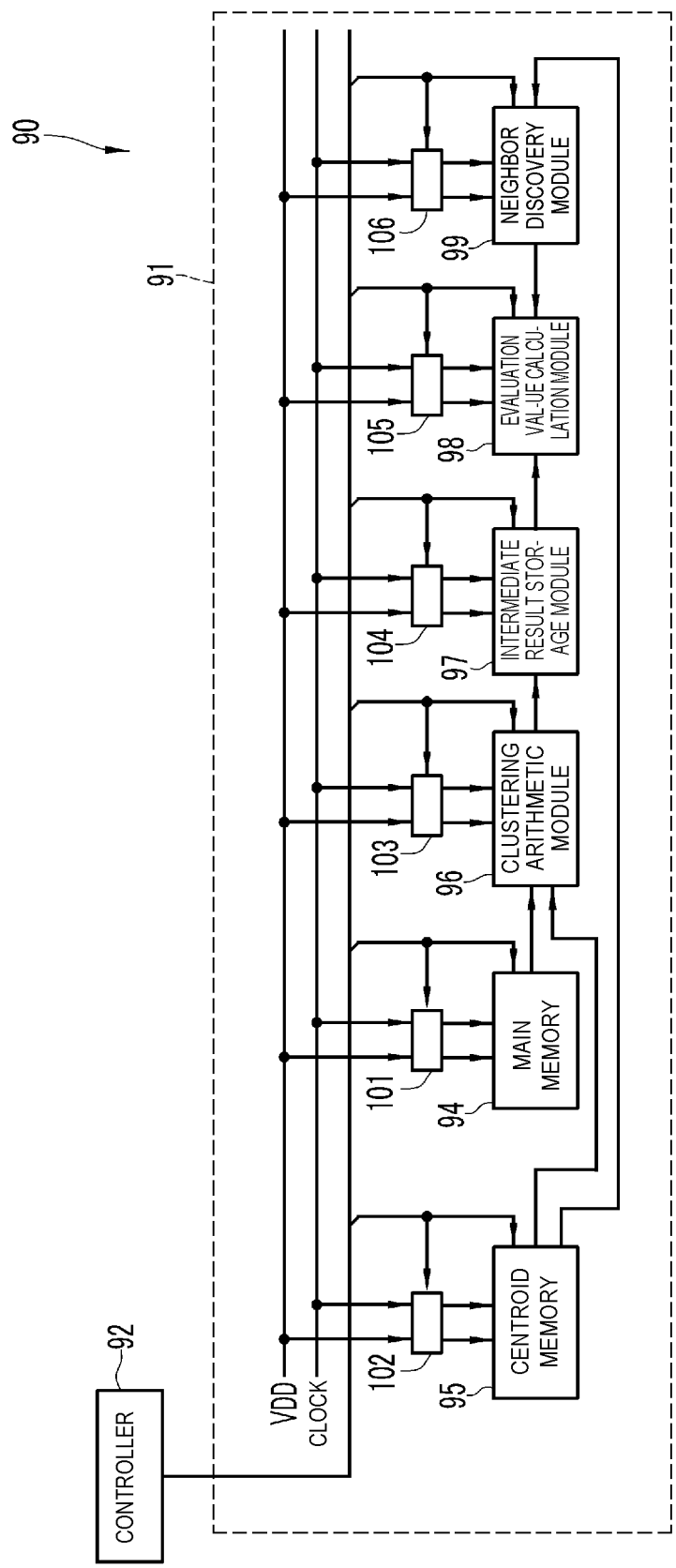
FIG. 14 is a block diagram illustrating a configuration of a clustering device performing pipeline clustering.

FIG. 14 illustrates an example in which the power gating and the clock gating are autonomously performed in a pipeline clustering device. A clustering device 90 includes a semiconductor circuit device 91 performing the arithmetic operation for the clustering, and a controller 92 controlling the operation of the semiconductor circuit device 91 by outputting various control signals such as the enable signal to each section of the semiconductor circuit device 91. The clustering device 90 performs the batch processing and the high-speed classification processing, as with the clustering device 70 illustrated in FIG. 13.

The semiconductor circuit device 91 includes a main memory 94, a centroid memory 95, a clustering arithmetic module 96, an intermediate result storage module 97, an evaluation value calculation module 98, and a neighbor discovery module 99. The semiconductor circuit device 91 includes a first pipeline performing the batch processing and a second pipeline performing the high-speed classification processing. The first pipeline includes the main memory 94, the centroid memory 95, the clustering arithmetic module 96, the intermediate result storage module 97, and the evaluation value calculation module 98, and the second pipeline includes the centroid memory 95, the neighbor discovery module 99, and the evaluation value calculation module 98. Therefore, the centroid memory 95, the intermediate result storage module 97, and the evaluation value calculation module 98 are operated in both of the batch processing and the high-speed classification processing.

Each stage of the first pipeline and the second pipeline, that is, the main memory 94, the centroid memory 95, the clustering arithmetic module 96, the intermediate result storage module 97, the evaluation value calculation module 98, and the neighbor discovery module 99 are configured to be independently operated, and are configured to perform the arithmetic operation by using the data input from the previous stage.

In the first pipeline, the clustering arithmetic module 96, the intermediate result storage module 97, and the evaluation value calculation module 98 are connected in this order, and the main memory 94 and the centroid memory 95 are each connected to the clustering arithmetic module 96, as the previous stage of the clustering arithmetic module 96. On the other hand, in the second pipeline, the intermediate result storage module 97 and the neighbor discovery module 99 are connected, as the previous stage of the evaluation value calculation module 98, and the centroid memory 95 is connected to the neighbor discovery module 99, as the previous stage of the neighbor discovery module 99.

The main memory 94 and the centroid memory 95 are the same as the main memory 74 and the centroid memory 75 of the semiconductor circuit device 71. The main memory 94 stores the element data in each of the plurality of memory modules provided in parallel, and reads out the vector component for each of the stored element data pieces in parallel one dimension at a time, in synchronization with the clock. The centroid memory 95 stores the cluster centroid in each of the plurality of memory modules provided in parallel, and reads out the vector component of the selected cluster centroid in parallel one dimension at a time, in synchronization with the clock. The main memory 94 and the centroid memory 95 are configured as a non-volatile memory.

The clustering arithmetic module 96 performs the same arithmetic processing as that of the arithmetic unit 81 (refer to FIG. 13) in the clustering arithmetic section 76 described above. The clustering arithmetic module 96 includes a plurality of distance calculation circuits, adding circuits, dividing circuits, multiplexers, registers, and the like, which are provided in parallel corresponding to each memory module of a plurality of main memories 94, calculates the distance between the element data and the cluster centroid in parallel for the element data, and calculates the cluster centroid, the data centroid of all the element data, or the like.

The intermediate result storage module 97 has the same function as that of the main register unit 82 (refer to FIG. 13) described above. The evaluation value calculation module 98 performs the same arithmetic processing as that of the evaluation value calculation circuit 78 described above, and has the same function as that of the logic section 78a and the evaluation register section 78b (both refer to FIG. 13) in the evaluation value calculation circuit 78. The evaluation value calculation module 98 calculates the evaluation value by using the distance between the data centroids that is calculated by the neighbor discovery module 99 when performing the high-speed classification processing, and the data that is output by the clustering arithmetic module 96 when performing the batch processing and retained in the intermediate result storage module 97 as the intermediate arithmetic result. The neighbor discovery module 99 performs the same arithmetic processing as that of the neighbor discovery circuit section 77 (refer to FIG. 13) described above.

In the semiconductor circuit device 91, the main memory 94, the centroid memory 95, the clustering arithmetic module 96, the intermediate result storage module 97, the evaluation value calculation module 98, and the neighbor discovery module 99 are each the target circuit for the power gating and the clock gating, and gating sections 101 to 106 are provided corresponding thereto. The configuration and the function of the gating sections 101 to 106 are the same as those of the gating section 14A (refer to FIG. 2) provided corresponding to the arithmetic module 11A of the first embodiment.

In this example, the main memory 94 and the centroid memory 95 are each a memory circuit. The clustering arithmetic module 96, the evaluation value calculation module 98, and the neighbor discovery module 99 are each an arithmetic module performing the arithmetic operation for the clustering of classifying the plurality of element data pieces into the plurality of clusters, and the intermediate result storage module 97 is an intermediate result storage section storing the intermediate result in the middle of the arithmetic operation for the clustering.

The control signal (for example, the row select signal) input to the main memory 94 is input to the gating section 101, and the control signal (for example, the column select signal) input to the centroid memory 95 is input to the gating section 102. Accordingly, the main memory 94 and the centroid memory 95 are subjected to the power gating and the clock gating by the gating sections 101 and 102, on the basis of the control signal input thereto.

The control signal (for example, the enable signal) input to the clustering arithmetic module 96, the intermediate result storage module 97, the evaluation value calculation module 98, and the neighbor discovery module 99, corresponding to the gating sections 103 to 106, is input to the gating sections 103 to 106. Accordingly, the clustering arithmetic module 96, the intermediate result storage module 97, the evaluation value calculation module 98, and the neighbor discovery module 99 are subjected to the power gating and the clock gating by the gating sections 103 to 106, on the basis of the control signal input thereto.

Figure 15:
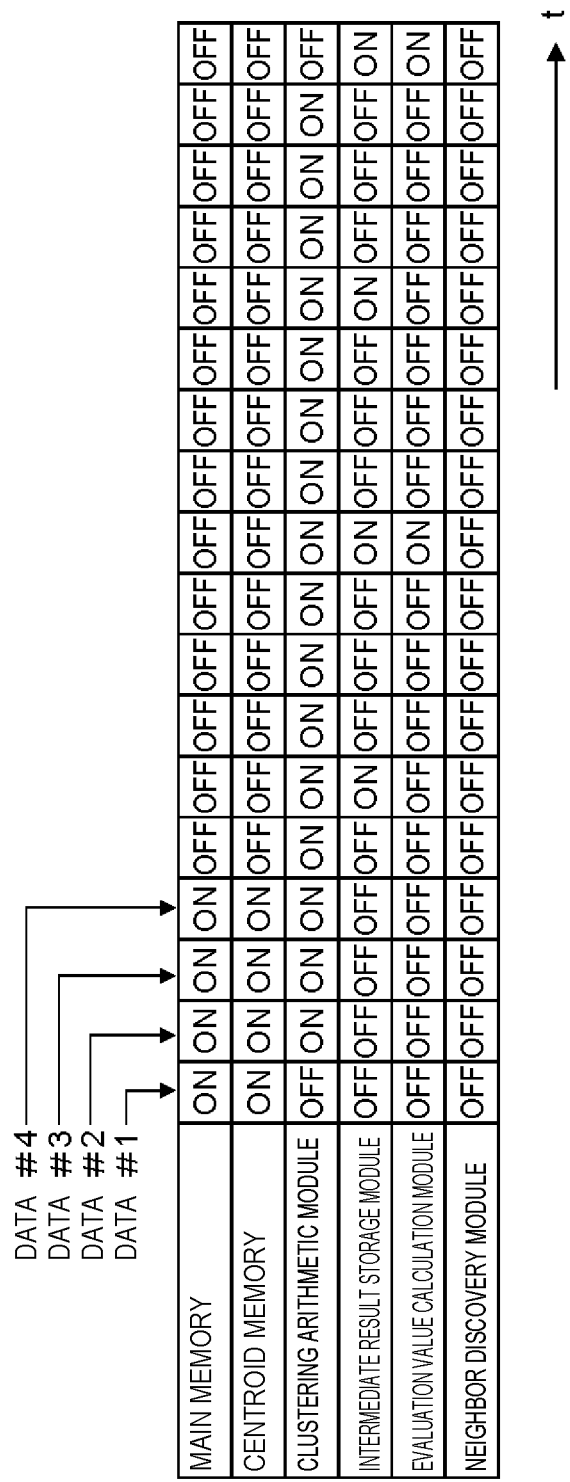
FIG. 15 is an explanatory diagram illustrating an example of an On and Off pattern of each section during batch processing of a pipeline clustering device.
Figure 16:
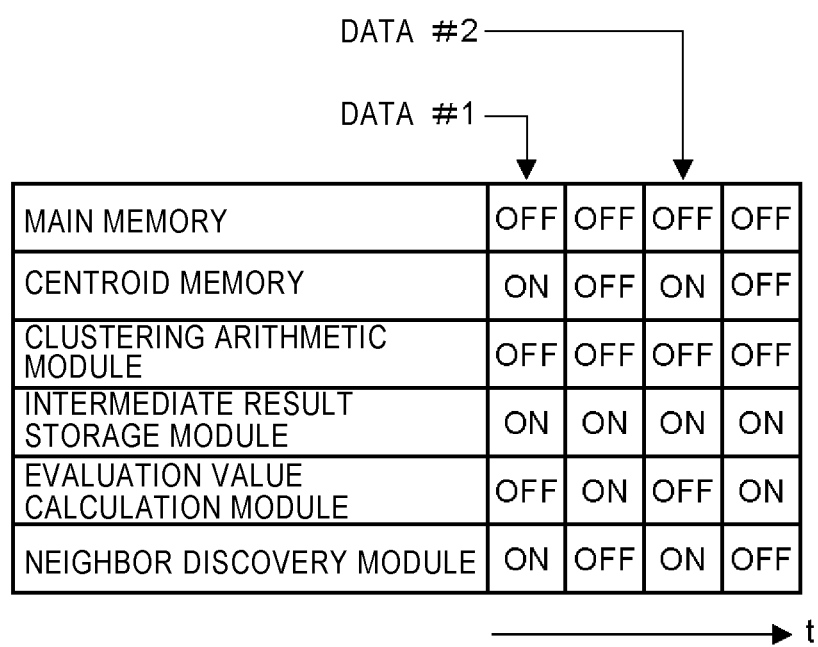
FIG. 16 is an explanatory diagram illustrating an example of an On and Off pattern of each section during high-speed classification processing of a pipeline clustering device.

As with FIG. 8, FIG. 15 illustrates an example of the state of the power gating and the clock gating of each section of the semiconductor circuit device 91 when performing the batch processing. In FIG. 15, for convenience, a case is illustrated in which four element data pieces (#1 to #4) are clustered from the main memory 94. Similarly, FIG. 16 illustrates an example of the state of the power gating and the clock gating of each section of the semiconductor circuit device 91 when performing the high-speed classification processing. In FIG. 16, a case is illustrated in which two new element data pieces (#1 and #2) are input to the neighbor discovery module 99 and classified into the existing cluster.

As described above, in the semiconductor circuit device 91, each section is subjected to the power gating and the clock gating by the batch processing and the high-speed classification processing, and thus, the power consumption is effectively reduced. The control signal used to control enable or disable of the main memory 94, the centroid memory 95, the clustering arithmetic module 96, the intermediate result storage module 97, the evaluation value calculation module 98, and the neighbor discovery module 99, which are the target circuit, is input to the gating control circuit provided for each of the target circuits such that the power gate switch and the clock gate switch are turned on and off, and thus, the power gating and the clock gating are easily attained.

Fourth Embodiment

In a fourth embodiment, information relevant to the target circuit is detected by a detector provided for each of the target circuits, and in a case where the detected information does not satisfy a predetermined condition, a feedback signal is output to suppress the output of the On signal from the gating control circuit.

Figure 17:
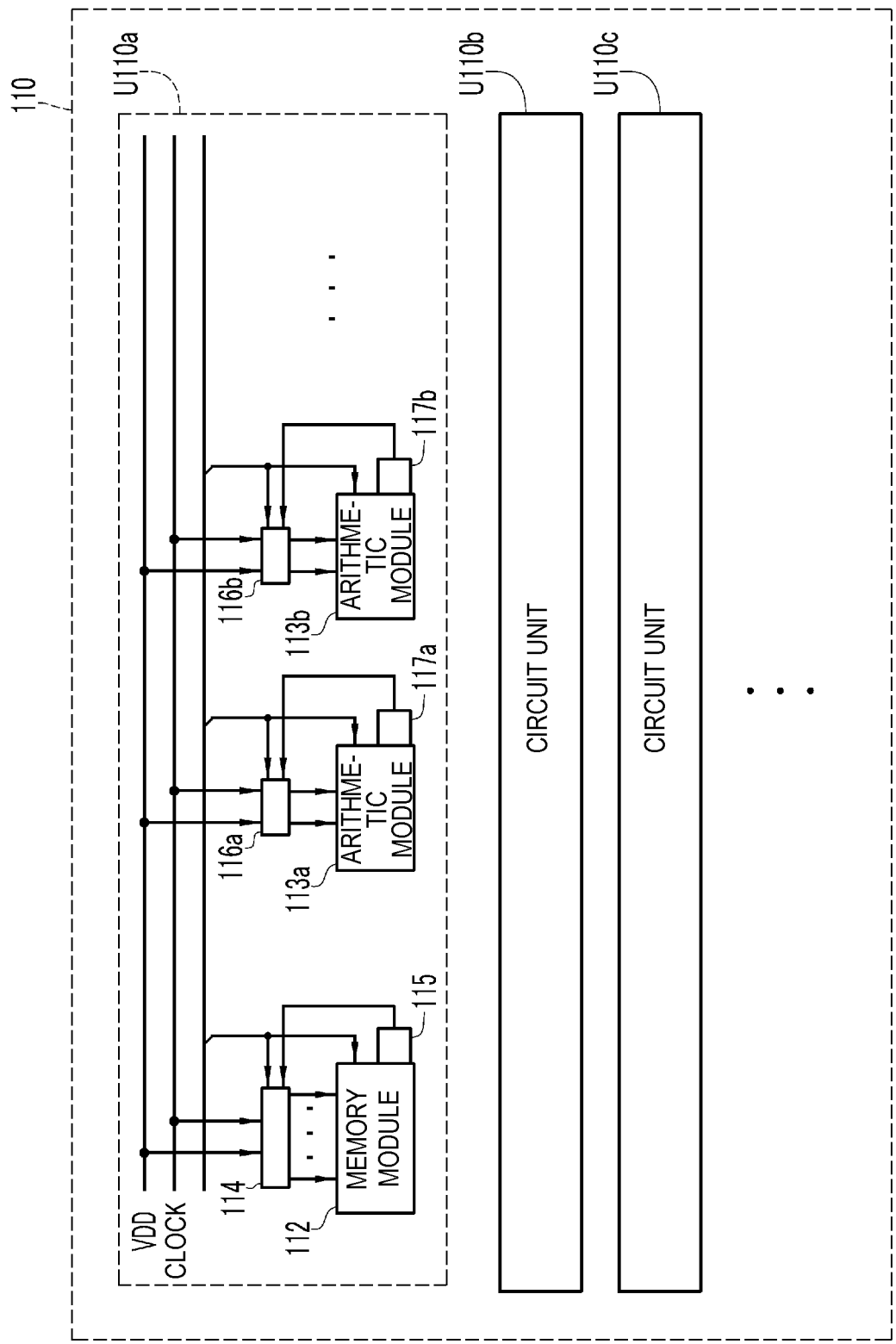
FIG. 17 is a block diagram illustrating an example of a semiconductor circuit device including a detector in a circuit module.

In FIG. 17, in a semiconductor circuit device 110, a plurality of circuit units U110a, U110b . . . having the same circuit configuration are provided, and the arithmetic processing can be performed in parallel by the circuit units U110a, U110b . . . . Hereinafter, in a case where the circuit units U110a, U110b . . . are not distinguished, the circuit units will be described as a circuit unit U110.

The circuit units U110a, U110b . . . have the same circuit configuration, and thus, hereinafter, the configuration of the circuit unit U110a will be described. The circuit unit U110a includes a memory module 112 and arithmetic modules 113a, 113b . . . . The memory module 112 has the same configuration as that of the memory module 13 (refer to FIG.

3) of the first embodiment, includes a memory array including a plurality of non-volatile memory cells, and a register, and receives the enable signal and a plurality of select signals from the controller (not illustrated). The arithmetic modules 113a and 113b each have the same configuration as that of the arithmetic module 11A (refer to FIG. 2) of the first embodiment, and receives the enable signal.

In the memory module 112, a gating section 114 corresponding thereto is provided, and the power gating and the clock gating are performed by the gating section 114. In the memory module 112, a detector 115 is provided. In this example, the detector 115 includes a temperature sensor detecting the temperature of the memory module 112, and a determination circuit activating the feedback signal in a case where the temperature detected by the temperature sensor is a predetermined threshold value or higher. The feedback signal from the detector 115 is input to the gating section 114.

In the arithmetic modules 113a, 113b . . . , gating sections 116a, 116b . . . each corresponding thereto are provided. In the arithmetic modules 113a, 113b . . . , detectors 117a, 117b . . . are provided. The detectors 117a, 117b . . . have the same configuration as that of the detector 115, detect the temperature of the corresponding arithmetic modules 113a, 113b . . . , and activate the feedback signal in a case where the detected temperature is a predetermined threshold value or higher. The feedback signals from the detectors 117a, 117b . . . are input to the gating sections 116a, 116b . . . provided in the corresponding arithmetic modules 113a, 113b . . . .

As described below, the configuration of the gating section 114 and the gating sections 116a, 116b . . . is the same as that of the gating section 15 (refer to FIG. 3) and the gating section 14A (refer to FIG. 2) of the first embodiment, except that the gating control circuit applies the feedback signal to control the On and Off of the power gate switch and the clock gate switch. Therefore, the power gating and the clock gating with respect to the memory module 112 by the gating section 114, and the power gating and the clock gating with respect to the arithmetic modules 113a, 113b . . . by the gating sections 116a, 116b . . . are the same as those with respect to the memory module 13 and the arithmetic module 11A of the first embodiment, except that the control is performed by further using the feedback signal.

Figure 18:
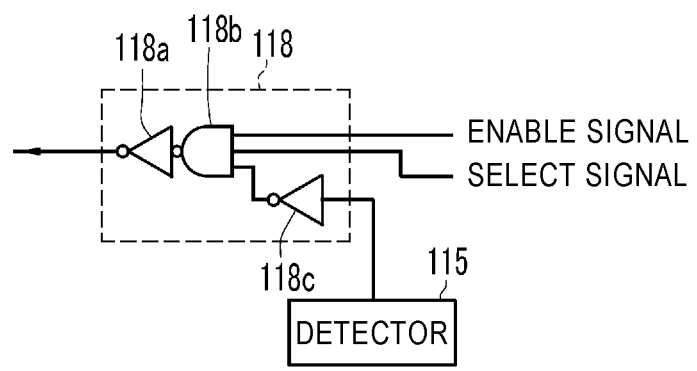
FIG. 18 is a circuit diagram illustrating a gating control circuit corresponding to a memory module.

A gating control circuit 118 illustrated in FIG. 18 controls the On and Off of the power gate switch corresponding to each of the memory blocks of the memory module 112. The gating control circuit 118 includes a NOT circuit 118a and a NAND circuit 118b connected in series, and a NOT circuit 118c connected to one input end of the NAND circuit 118b, and controls the power gate switch with the output of the NOT circuit 118a. The enable signal and the select signal input to the memory module 112 are input to the other two input ends of the NAND circuit 118b. The feedback signal form the detector 115 is input to the NOT circuit 118c.

In a case where the feedback signal from the detector 115 is active, the gating control circuit 118 continuously outputs the Off signal even when the enable signal and the select signal are activated. Accordingly, in a case where the temperature of the memory module 112 is the threshold value or higher, the output of the On signal is suppressed, and the driving voltage is not supplied to the memory block. It is obvious that the feedback signal is inactive in a case where the temperature of the memory module 112 is lower than the threshold value, and thus, in a case where the enable signal and the select signal are activated, the gating control circuit 118 outputs the On signal such that the driving voltage is supplied to the memory block corresponding to the activated select signal.

Figure 19:
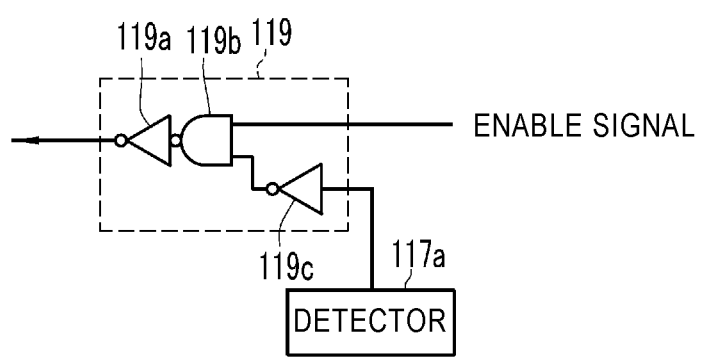
FIG. 19 is a circuit diagram illustrating a gating control circuit corresponding to an arithmetic module.

A gating control circuit 119 illustrated in FIG. 19 controls the On and Off of the power gate switch and the clock gate switch corresponding to the register of the arithmetic module 113a. The gating control circuit 119 includes a NOT circuit 119a and a NAND circuit 119b connected in series, and a NOT circuit 119c connected to one input end of the NAND circuit 119b, and controls the power gate switch and the clock gate switch with the output of the NOT circuit 119a. The enable signal input to the arithmetic module 113a is input to the other input end of the NAND circuit 119b. The feedback signal from the detector 117a is input to the NOT circuit 119c.

Therefore, in a case where the feedback signal of the detector 117a is active, the gating control circuit 119 continuously outputs the Off signal even when the enable signal is activated. Accordingly, in a case where the temperature of the arithmetic module 113a is the threshold value or higher, the output of the On signal is suppressed, and the driving voltage is not supplied to the arithmetic module 113a. It is obvious that the feedback signal is inactive in a case where the temperature of the arithmetic module 113a is lower than the threshold value, and thus, in a case where the enable signal is activated, the gating control circuit 119 outputs the On signal such that the driving voltage is supplied to the arithmetic module 113a. The same applies to the register and the arithmetic module 113b of the memory module 112.

In this example, the activation and the inactivation of the feedback signal are switched on the condition that the temperature is lower than the threshold value, but the condition is not limited thereto. For example, the condition may be that the number of arithmetic operation pieces of the arithmetic module executed in the recent period of time, an arithmetic operation execution frequency, the number of times of the data reading or writing of the memory module, the power consumption, a processing delay, or the like is less than a threshold value. The detector may have a configuration according to the set condition. Different conditions may be set for each of the circuit modules. In a case where the feedback signal is sent to the controller and the feedback signal is active for the module in the circuit unit, the control may be performed such that the arithmetic operation is performed by substituting the other module in the circuit unit, or the arithmetic operation is executed by using the other circuit unit.

A configuration in which the output of the On signal is suppressed by using the feedback signal as described above can also be used in the semiconductor circuit devices of the other embodiments described above.

The target circuit described in each of the embodiments described above is an example. The target circuit is not limited to the above description, and various circuits to which the control signal such as the enable signal of the register or the column select signal to the memory is input can be the target circuit. The configuration of the gating section described in each of the embodiments described above is an example, and is not limited to the above description. It is sufficient that the gating section is capable of performing the power gating and the clock gating, in accordance with the control signal, and for example, the gating section may have a circuit configuration according to the control signal.

REFERENCE SIGNS LIST 10, 40, 60, 71, 91, 110: Semiconductor circuit device
11A, 11B, 113a, 113b: Arithmetic module 13, 112: Memory module
14A, 14B, 15, 51 to 59, 83 to 89, 101 to 106, 114, 116a, 116b: Gating section
24, 34, 36, 118, 119: Gating control circuit
25, 35, 37: Power gate switch
26, 38: Clock gate switch
42: Main memory module
70, 90: Clustering device
74, 94: Main memory
75, 95: Centroid memory
76: Clustering arithmetic section
77: Neighbor discovery circuit section
78: Evaluation value calculation circuit
78a: Logic section
78b: Evaluation register section
81: Arithmetic unit
82: Main register unit
96: Clustering arithmetic module
97: Intermediate result storage module
98: Evaluation value calculation module
99: Neighbor discovery module
115, 117a, 117b: Detector
A43: Multiplication module
A44: Cumulative arithmetic module
A45: Batch normalization module
A46: Activation function module
A47: Pooling module
A48: Sampling module
A49: Fully-connected classification module
M41: Buffer module
M42: Main memory module

The invention claimed is:

1. A semiconductor circuit device in which a plurality of target circuits are provided and a control signal for controlling enable and disable is input to each of the plurality of target circuits, the device comprising:
   a gating control circuit provided for each of the plurality of target circuits; and
   a power gate switch provided for each of the plurality of target circuits, wherein
   the control signal is input to each of the plurality of target circuits from a controller through a signal line,
      the signal line is connected to the gating control circuit and the control signal is input to the gating control circuit, and the gating control circuit outputs an On signal in response to the control signal for enabling the target circuit and outputs an Off signal in response to the control signal for disabling the target circuit,
      each of the plurality of target circuits is operated by a supply of a driving voltage from a power source through a power line,
      the power gate switch is provided on the power line, and the power gate switch is turned on in response to an input of the On signal from the gating control circuit to supply the driving voltage to the target circuit and is turned off in response to an input of the Off signal from the gating control circuit to block the driving voltage to the target circuit.

2. The semiconductor circuit device according to claim 1, further comprising
   a clock gate switch for each of the plurality of target circuits, which is provided on each clock line for each of the plurality of target circuits for supplying a clock to the target circuit and turned on by the On signal.

3. The semiconductor circuit device according to claim 1,
   wherein any one of the plurality of target circuits includes a first register in which enable and disable are controlled by a first enable signal, and
   in the gating control circuit corresponding to the target circuit including the first register, the first enable signal is input as the control signal.

4. The semiconductor circuit device according to claim 1,
   wherein any one of the plurality of target circuits is a non-volatile memory circuit including a plurality of memory blocks in which enable and disable are controlled by a select signal according to a memory address, and
   in the gating control circuit corresponding to the memory circuit, the select signal is input as the control signal.

5. The semiconductor circuit device according to claim 1,
   wherein any one of the plurality of target circuits is a memory circuit including a plurality of memory blocks in which enable and disable are controlled by a select signal according to a memory address, and including a second register in which enable and disable are controlled by a second enable signal, and
   in the gating control circuit corresponding to the memory circuit, the select signal is input as the control signal, the second enable signal is input, and the On signal is output in response to the input of the select signal for enabling the memory circuit and the input of the second enable signal for enabling the second register.

6. The semiconductor circuit device according to claim 1,
   wherein any one of the plurality of target circuits is an arithmetic module including an arithmetic circuit and a third register in which enable and disable are controlled by a third enable signal, and
   in the gating control circuit corresponding to the arithmetic module, the third enable signal is input as the control signal.

7. The semiconductor circuit device according to claim 1, further comprising
   a detector provided for each of the plurality of target circuits, which detects information relevant to the target circuit and activates a feedback signal when the detected information does not satisfy a predetermined condition,
   wherein the gating control circuit does not output the On signal when the feedback signal from the detector provided in the corresponding target circuit is active.

8. The semiconductor circuit device according to claim 1,
   wherein the plurality of target circuits include a plurality of arithmetic modules each including an arithmetic circuit, and
   the plurality of arithmetic modules are connected in series, and an arithmetic result of the previous arithmetic module is acquired by the subsequent arithmetic module and used in arithmetic operation.

9. The semiconductor circuit device according to claim 8,
   wherein the plurality of arithmetic modules include a convolutional arithmetic module for performing convolutional arithmetic operation, an activation function module for performing activation function arithmetic operation, a pooling module for performing pooling processing, and a fully-connected classification module for performing fully-connected classification processing arithmetic operation, and perform arithmetic processing corresponding to a convolutional neural network.

10. The semiconductor circuit device according to claim 8, wherein the plurality of arithmetic modules include a convolutional arithmetic module for performing convolutional arithmetic operation, an activation function module for performing activation function arithmetic operation, and a pooling module for performing pooling processing, and perform arithmetic processing corresponding to a fully convolutional neural network.

11. The semiconductor circuit device according to claim 9, wherein the convolutional arithmetic module is a multiplication module for performing multiplication, and a cumulative arithmetic module for performing cumulative arithmetic operation of a multiplication result of the multiplication module.

12. The semiconductor circuit device according to claim 8, wherein each of the plurality of arithmetic modules is an arithmetic module including an arithmetic circuit and a third register in which enable and disable are controlled by a third enable signal, and in the gating control circuit corresponding to the arithmetic module, the third enable signal is input as the control signal.

13. The semiconductor circuit device according to claim 1, wherein the plurality of target circuits, include:

a non-volatile main memory for storing a plurality of element data pieces to be classified to a plurality of clusters;

a non-volatile centroid memory for storing cluster centroid of the plurality of clusters; and one or a plurality of arithmetic modules for performing arithmetic operation for classifying the plurality of element data pieces to the plurality of clusters.

* * * * *